US007242796B2

(12) United States Patent
Matsui et al.

(10) Patent No.: US 7,242,796 B2
(45) Date of Patent: Jul. 10, 2007

(54) CERTIFIED PAPER AND AN APPARATUS FOR DISCRIMINATING THE GENUINENESS THEREOF

(75) Inventors: Toru Matsui, Osaka (JP); Benedikt Ahlers, Berlin (DE); Anett Bailleu, Berlin (DE); Roland Gutmann, Falkensee (DE); Frank Kappe, Rheda-Wiedenbruck (DE)

(73) Assignee: Bundesdruckerei GmbH, Berlin (DE)

( * ) Notice: Subject to any disclaimer, the term of this patent is extended or adjusted under 35 U.S.C. 154(b) by 631 days.

(21) Appl. No.: 10/363,015

(22) PCT Filed: Aug. 29, 2001

(86) PCT No.: PCT/EP01/09937

§ 371 (c)(1), (2), (4) Date: Jul. 30, 2003

(87) PCT Pub. No.: WO02/18150

PCT Pub. Date: Mar. 7, 2002

(65) Prior Publication Data

US 2004/0051300 A1 Mar. 18, 2004

(30) Foreign Application Priority Data

Aug. 31, 2000 (JP) ............................ 2000-263762
Aug. 31, 2000 (JP) ............................ 2000-263763

(51) Int. Cl.
*G06K 9/00* (2006.01)

(52) U.S. Cl. ......................... 382/135; 356/71; 250/200

(58) Field of Classification Search ................ 382/112, 382/135; 283/82; 235/454, 491; 356/71; 250/271, 458

See application file for complete search history.

(56) References Cited

U.S. PATENT DOCUMENTS

| | | | | |
|---|---|---|---|---|
| 4,587,434 | A | 5/1986 | Roes et al. | 250/556 |
| 5,502,304 | A * | 3/1996 | Berson et al. | 250/271 |
| 5,640,463 | A * | 6/1997 | Csulits | 382/135 |
| 5,918,960 | A * | 7/1999 | Hopwood et al. | 356/71 |
| 5,960,103 | A * | 9/1999 | Graves et al. | 382/135 |
| 6,050,387 | A * | 4/2000 | Iwaki | 194/207 |
| 6,459,806 | B1 * | 10/2002 | Raterman et al. | 382/135 |
| 6,473,165 | B1 * | 10/2002 | Coombs et al. | 356/71 |
| 6,542,298 | B1 * | 4/2003 | Aoki | 359/483 |
| 6,731,785 | B1 * | 5/2004 | Mennie et al. | 382/135 |
| 6,819,646 | B1 * | 11/2004 | Kitaoka et al. | 369/112.01 |
| 6,918,482 | B2 * | 7/2005 | Thierauf | 194/207 |
| 6,987,868 | B1 * | 1/2006 | Atarashi et al. | 382/112 |

FOREIGN PATENT DOCUMENTS

| | | |
|---|---|---|
| DE | 197 08 543 | 3/1997 |

* cited by examiner

*Primary Examiner*—Joseph Mancuso
*Assistant Examiner*—Andrae Allison
(74) *Attorney, Agent, or Firm*—Darby & Darby

(57) ABSTRACT

An apparatus for discriminating the genuineness of a security mark is provided having a first light detecting element for detecting a light emitted from a luminescent ink of the security mark placed in a specified environment and a second light detecting element for detecting a reflected light from a non-luminescent ink of the security mark. The first and second light detecting elements detect the light from the same location of a bank note. A third light detecting element detects the light intensity of a light emitted from a monitor mark that can be compared with a preset reference light intensity to calculate a deviation from the reference light intensity. The output of the first light detecting element can be converted into a corrected output value corresponding to the calculated deviation. The genuineness of the bank note can be discriminated based on the corrected output value.

10 Claims, 18 Drawing Sheets

CERTIFIED PAPER AND AN APPARATUS FOR DISCRIMINATING THE GENUINENESS THEREOF

BACKGROUND OF THE INVENTION AND RELATED ART STATEMENT

This invention relates to a discriminating apparatus capable of discriminating genuineness of various certified papers including, for example, bank notes, securities such as stocks and various other certified documents such as slips at a higher reliability.

There have been conventionally known discriminating apparatuses for discriminating genuineness of bank notes, securities or like certified papers. Such discriminating apparatuses discriminate genuineness of certified paper by photoelectrically scanning characters, figures, symbols, or (hereinafter referred to collectively as "printed marks") printed in specified positions of the paper, and comparing a scanned pattern with a prestored pattern of the genuine certified paper.

However, improved forging technology has made it difficult to discriminate forged certified paper from genuine certified paper only based on usual printed patterns. German Patent Publication DE 197 085 43 A1 discloses printing of bank notes with a luminescent ink containing electroluminescent material which emits a light upon application of ultraviolet rays or an alternating voltage. The use of such an electroluminescent ink makes the certified paper luminous upon projection of ultraviolet rays or upon being placed in an alternating-current electromagnetic field and accordingly enables discrimination of genuineness of certified paper by detecting the presence or absence of the luminous light, even if the printed patterns made on the genuine and counterfeit certified papers by usual printing coincides with that of the genuine.

It could be seen, however, that if counterfeit bank notes should use the above luminescent ink, the discrimination of genuineness becomes more difficult. In particular, it is easy to forge an electroluminescent pattern similar to that of the genuine certified paper by spraying and adhering the electroluminescent material to the surface of the paper because the electroluminescent material is comprised of ultrafine particles. Accordingly, discrimination of genuineness cannot be made for the paper having the pattern of the electroluminescent by such an operation even if the electroluminescent is made luminous in an alternating-current electromagnetic field. The same applies to other luminescent inks other than the electroluminescent.

In order to solve the above problem, genuineness may be discriminated by detecting lights from both a printed mark made of the luminescent ink and the one made of the usual ink and discriminating the presence of a specified correlation between the detected values or by comparing the detected value of the printed mark made of the luminescent ink with a reference value corresponding to a printed mark made on a genuine certified paper. However, even with such discrimination, the degree of light emission may differ in the same environment of the alternating-current electromagnetic field due to different printed positions of particularly the luminescent ink and different printed states even in the same printing position from printing apparatus to printing apparatus. This presents a new problem of a reduced precision of genuineness discrimination.

In view of the above problems residing in the prior art, an object of the present invention is to provide a certified paper discriminating apparatus capable of securely discriminating genuineness even if the printed state of a luminescent ink on certified papers varies.

SUMMARY OF THE INVENTION

The present invention is directed to a certified paper on which a security mark is printed using both a luminescent ink which emits a light upon being placed in a specified environment and a usual nonluminescent ink, and/or a monitor mark used to monitor a printed tone of the security mark is printed in vicinity of the security mark using the luminescent ink.

With such an inventive certified paper, by scanning the monitor mark emitting a light in the specified environment when letting a specified certified paper discriminating apparatus in which a reference light intensity is stored beforehand scan the security mark of the certified paper, the printed tone of the security mark can be known by a comparison of the light intensity of the scanned monitor mark with the reference light intensity. Thus, a correction can be made based on the comparison result of the scanned security mark, such that data concerning the intensities of the lights from the security mark can be standardized.

Accordingly, an inconvenience residing in the prior art that precision of discrimination of the certified paper based on the varying light intensity data from the scanned security mark is lower due to such a variation can be solved, thereby improving precision in discriminating the genuineness of the certified paper.

The present invention is also directed to a certified paper discriminating apparatus for discriminating the genuineness of the certified paper according to claim 1 by scanning the certified paper in an extending direction of the monitor mark, comprising a first light detecting means for detecting a light emitted from the luminescent ink of the security mark upon being placed in the specified environment; a second light detecting means for detecting a reflected light from the nonluminescent ink of the security mark, the first and second light detecting means being so arranged as to detect the lights from the same position of the certified paper; a third light detecting means for detecting a light emitted from the monitor mark; a light intensity comparing means for comparing a light intensity detected by the third light detecting means with a preset reference light intensity to calculate a deviation from the reference light intensity; a light intensity converting means for converting an output value from the first light detecting means into a corrected output value corresponding to the deviation; and a genuineness discriminating means for discriminating the genuineness of the paper based on the corrected output value.

With the discriminating apparatus thus constructed, the monitor mark made of the luminescent ink of the certified paper fed into the discriminating apparatus emits a light upon being placed in the specified environment, and this light emission is detected by the third light detecting element. The light intensity corresponding to the monitor mark detected by the third light detecting element is compared with the reference light intensity set beforehand to calculate the deviation by the light intensity comparing means, and the output value from the first light detecting element is converted into the corrected output value corresponding to the deviation based on the calculation result by the light intensity converting means. The genuineness of the certified paper is discriminated based on the corrected output value by the genuineness discriminating means.

In this way, prior to discrimination of the genuineness of the certified paper, an electrical signal representing a standard density obtained by correcting the density of the luminescent ink of the printed monitor mark is sent to the genuineness discriminating means, which then makes a specified genuineness discrimination. Thus, such an inconvenience that different printed states of the luminescent ink on the certified papers influence a result of genuineness discrimination can be solved, thereby constantly realizing a proper genuineness discrimination.

The specified environment where the luminescent ink emits a light may be an environment of an alternating-current electromagnetic field or a light irradiating environment where infrared rays, ultraviolet rays and usual visible rays within a specified wavelength range are irradiated.

Preferably, the specified environment is an environment of an alternating-current electromagnetic field created upon application of an alternating voltage and the luminescent ink preferably has an electroluminescent property of emitting a light in the environment of the alternating-current electromagnetic field.

With such an arrangement, the luminescent ink is nonluminescent and colorless in a usual environment since it emits a light in the environment of the alternating-current electromagnetic field. Thus, the certified papers can be normally used without any trouble while the luminescent ink effectively performs its function in discriminating genuineness.

DETAILED DESCRIPTION OF THE PREFERRED EMBODIMENTS OF THE INVENTION

FIGS. 1 and 2 are perspective views showing one embodiment of a certified paper discriminating apparatus according to the present invention, wherein FIG. 1 shows a state where a casing lid is closed and FIG. 2 shows a state where the casing lid is open. FIG. 3 is an exploded perspective view showing one embodiment of an apparatus main body provided in a casing, and FIG. 4 is a perspective view showing the assembled apparatus main body. FIG. 5 is a section along A-A of FIG. 4, and FIG. 6 is a section along B-B of FIG. 4. It should be noted that, in FIGS. 1 to 4, directions of X-X, Y-Y, −X, +X, −Y and +Y are referred to as widthwise, forward and backward, leftward, rightward, forward and backward directions.

The certified paper discriminating apparatus 1 according to this embodiment discriminates genuineness of bank notes (certified papers) on which characters, figures or symbols are printed using both an electroluminescent ink which emits a light upon being placed in an environment of an alternating-current electromagnetic field and a usual printing ink. Particularly, the apparatus 1 is adapted to discriminate the genuineness of a bank note M on which a security mark is printed in a specified position for the genuineness discrimination using both inks and a monitor mark used to monitor a printed state of the inks is printed near the security mark using the luminescent ink.

In order to perform the above discrimination, a first, a second and a third detecting constructions 71, 72, 73 to be described later are provided in the discriminating apparatus 1. The first detecting construction 71 is adapted to detect an electroluminescent light emission in an environment of an alternating-current electromagnetic field, and the second detecting construction 72 is adapted to detect a reflected light from the usual ink. Further, the third detecting construction 73 is adapted to detect a printed state (density degree) of the luminescent ink.

As shown in FIGURES, an apparatus main body 2 and a control unit 8 are contained in a box-shaped casing 9 in the discriminating apparatus 1. The casing 9 is comprised of a rectangular parallelepipedic casing main body 91 and a lid 92; provided atop the casing main body 91.

A pair of brackets 93 extending in forward and backward directions are provided at the opposite sides of the upper surface of the casing main body 91 with respect to its widthwise direction. The lid 92 is made displaceable between a closing position shown in FIG. 1 where it is placed on the casing main body 91 and an exposing position shown in FIG. 2 where it stands at the rear end of the casing main body 91 by rotatably supported about a horizontal axis 94 while having its rear end tightly held between the pair of brackets 93.

With the lid 92 in its closing position, a note transport path 95 is defined between the upper surface of the casing main body 91 and the lower surface of the lid 92 as shown in FIG. 1. When a bank note M is inserted into the note transport path 95 from the front side of the casing 9, an unillustrated sensor detects it and a driving mechanism is driven in accordance with a drive signal from the control unit 8 sent in response to a detection signal of the sensor to pull the bank note M into the note transport path 95. Whether or not the inserted bank note M is genuine is discriminated by a discriminating mechanism (first and second detecting constructions 71 and 72) contained in the apparatus main body 2 as described later.

A plurality of guide projections **95*a* elongated in forward and backward directions are formed on the upper surface of the casing main body 91 of the note transport path 95, and elongated grooves 95 are formed between adjacent guide projections 95*a*. These guide projections 95*a* and the elongated grooves 95*b* form a top plate 950 of the casing main body 91** as a transport path for the bank note M.

The plurality of elongated grooves **95*b* are formed with notches in their front and rear positions, through which notches top parts of transport rollers 95*c* project. On the other hand, a pair of front and rear auxiliary rollers 95*d* facing the transport rollers 95*c* are provided on the rear surface of the lid 92. The bank note M inserted into the note transport path 95 passes through the note transport path 95 by the rotation of the transport rollers 95*c* while being tightly held between the transport rollers 95*c* and the auxiliary rollers 95*d* and is discharged to the outside through the rear end of the note transport path 95**.

A display lamp assembly 98 is provided at a front position of the top of the lid 92. The display lamp assembly 98 is comprised of a ready lamp **98*a* for displaying whether the discriminating apparatus 1 is in an operable state, a success lamp 98*b* for displaying whether a discrimination result on genuineness of the bank note M is a success, and a failure lamp 98*c* for displaying whether the discrimination result on genuineness of the bank note M is a failure. The ready lamp 98*a* is turned on by turning the power switch 96 on, thereby showing that the apparatus main body 2 is in a state capable of discriminating. While the apparatus main body 2 is undergoing a discrimination process, this ready lamp 98*a* is turned off, thereby letting an operator know that he should not insert a next bank note until the ready lamp 98*a*** is turned on again.

As shown in FIGS. 3 to 6, the apparatus main body 2 includes a sensor unit 20 constructed by integrally making light detecting elements and a light emitting element to be described later, optical members, printed circuit boards into a module; a roller member 3 provided in the casing main body 91; and a sensor casing 4 which is so provided in the lid 92 as to face the outer circumferential surface of the roller member 3 and on which various sensors, circuit boards, etc. are mounted.

The roller member 3 serves as one of electrodes to which an alternating voltage from an alternating-current power supply 30 (see FIG. 5) is applied, and is comprised of a metallic center axis 31 extending in widthwise direction and rotatably supported about its longitudinal axis on specified bearings provided in the casing main body 91, a metallic disk 32 concentrically and integrally fixed to the center axis 31, an insulating ring 33 made of a material having a high permittivity such as barium titanate ($BaTiO_3$) and concentrically pressingly fitted on the metallic disk 32, and a metallic ring 34 pressingly fitted on the insulating ring 33 and having an outer circumferential surface held in direct contact with the bank note M.

A lead plate 35 is adopted as the other electrode to which the alternative voltage is applied. This lead plate 35 is comprised of a flat lead plate main body 35*a* and an electrode piece 35*b* formed by bending a front end portion of the lead plate main body 35*a* downward. An alternating-current electromagnetic field is created in the note transport path 95 by applying an alternating voltage from the alternating-current power supply 30 to the roller member 3 and the lead plate 35 with the bank note M introduced to the note transport path 95.

On the other hand, a rectangular roller fitting window 91*a* (see FIG. 2) is formed in a center position of the top plate 950 of the casing main body 91, and the metallic ring 34 of the roller member 3 projects to the outside through this roller fitting window 91*a*. The roller member 3 is biased upward by a biasing force from an unillustrated biasing means, whereby the top thereof is located above the guide projections 95*a*.

A pattern of stripes extending in the axis and having a specified pitch is formed on the entire outer circumferential surface of the metallic ring 34, and a photoreflector 36 is provided in vicinity of the roller member 3. This photoreflector 36 is so constructed as to project a light onto the outer circumferential surface of the metallic ring 34 and receive the reflected light, and detects a rotating speed of the roller member 3 by detecting a change of the reflected light caused by the stripe pattern.

The sensor casing 4 is comprised of a casing main body 41 which is square in plan view and has a specified thickness, and a funnel-shaped portion 42 continuously formed below the casing main body 41 and having the shape of an inverted truncated rectangular pyramid. On the other hand, a rectangular window 92*b* (see FIGS. 2 and 5) corresponding to the funnel-shaped portion 42 is formed in a bottom plate 92*a* of the lid 92. In the inner surfaces of the rectangular window 92*b* are formed slanted edge portions 92*c* corresponding to the inclination of the surrounding wall surfaces of the funnel-shaped portion 42 as shown in FIG. 5. The sensor casing 4 fitted into the rectangular window 92*b* from above is mounted in the lid 92 while having its bottom surface exposed to the outside by the engagement of the surrounding wall surfaces of the funnel-shaped portion 42 with the slanted edge portions 92*c*.

The sensor casing 4 has a substrate mounting recess for mounting a substrate 5 to be described later formed in its upper surface of the casing main body 41 while having a glass substrate mounting recess 44 for mounting a glass substrate 6 to be described later formed in its bottom surface of the funnel-shaped portion 42. A portion corresponding to an optical path between the respective recesses 43, 44 is cut away to communicate the recesses 43, 44, thereby forming a pair of optical-path holes 45 (first optical-path hole 45*a* on the left side and a second optical-path hole 45*b* on the right side) rectangular in plan view. A light having passed through the glass substrate 6 propagates to the bottom of the substrate 5 through this optical-path hole 45.

Further, a LED mounting hole 46 for mounting a LED 54 to be described later is formed in a position at the bottom of the substrate mounting recess 43 and on the right side of the optical-path holes 45. A lower part of this LED mounting hole 46 communicates with the glass substrate mounting recess 44. Accordingly, a light from the LED 54 is incident on the glass substrate 6 through the LED mounting hole 46 and is reflected at a specified position (projection spot P (see FIG. 6) to be described later) to be projected toward the rear surface of the substrate 5.

A lead plate mounting recess 47 for mounting the lead plate 35 is provided in the funnel-shaped portion 42 in a position adjacent to the rear part of the glass substrate mounting recess 44. The electrode piece 35*b* of the lead plate 35 is fitted in this lead plate mounting recess 47 and is fixed by means of a screw or the like. The electrode piece 35*b* is so dimensioned that its bottom end faces the top plate 950 (see FIG. 2) of the casing main body 91 with the lead plate 35 mounted on the sensor casing 4.

The substrate 5 is used to apply a specified electrical processing to outputs of light detecting devices 51 mounted on its rear surface and to enable wiring, etc. for supplying a power to the LED 54. Light detecting devices 51 are arranged in a section of the substrate 5 corresponding to the optical-path holes 45 of the sensor casing 4, and the LED (light-emitting diode) 54 as a light emitting element is provided in a section of the substrate 5 corresponding to the LED mounting hole 46.

The light detecting devices 51 include a first light detecting device 52 provided in a left-side position on the rear surface of the substrate 5 so as to correspond to the first optical-path hole 45*a*, and a second light detecting device 53 provided adjacent to the first light detecting device 52 so as to correspond to the second optical-path hole 45*b*. A first and a third light detecting elements 521, 522 are provided on the bottom surface of the first light device 52, and a second light detecting element 531 is provided on the bottom surface of the second light detecting device 53.

The first and third light detecting elements 521, 522 are adapted to detect a light from an electroluminescent material having a characteristic of emitting a light in an alternating-current electromagnetic field, i.e. a so-called electroluminescent light. In order to detect such an electroluminescent light, a band-pass filter 52*a* for causing only the electroluminescent light to transmit and cutting other lights is placed on the front surface of the first light detecting device 52. Only the electroluminescent light can be made incident on the first light detecting device 52 by the presence of this band-pass filter 52*a*.

The first light detecting element 521 detects a light emitted from an electroluminescent ink portion M31 of a security mark M3 (see FIGS. 7 and 8A as well as 8B) on the bank note M as described later, whereas the second light detecting element 531 detects a reflected light from a usual ink portion M32 of the security mark M3. Further, the third light detecting element 522 detects a light from the monitor mark M4 on the bank note M.

The second light detecting elements 531 detects visible rays emitted from the LED 54 (LED light) and reflected by the surface of the bank note M, and a wavelength range of the light to be detected is wide. Accordingly, no such band-pass filter 52*a* placed on the first light detecting element 521 is placed on the front surface of the second light detecting element 531. In this embodiment, the wavelength of the light emitted from the LED 54 is differed from that of the electroluminescent light by way of precaution.

As shown in FIG. 6, the substrate 6 is made of a first glass substrate 61 pentagon in front view (when the glass substrate 6 is viewed in a direction of +Y), a parallelogrammatic second glass substrate 62 placed on the left side of the first glass substrate 61, and a trapezoidal third glass substrate 63 placed on the left side of the second glass substrate 62.

As shown in FIGS. 3 and 6, the right surface of the first glass substrate 61 is formed into a slanted surface 61*a* inclined downward at 45° to the right with respect to a horizontal surface, and the left surface thereof is formed parallel to this slanted surface 61*a*. A light emitted from the LED 54 is perpendicularly incident on the slanted surface 61*a*.

Both left and right surfaces of the second glass substrate 62 are formed parallel to the slanted surface 61*a*. The right surface of the third glass substrate 63 is formed parallel to the slanted surface 61*a* and the left surface thereof is formed into a perpendicular surface. The glass substrate 6 having a trapezoidal shape as a whole is formed by placing the first to third glass substrates 61, 62, 63 in widthwise direction. The solid shape of such a glass substrate 6 is set so that it is pressed into the glass substrate mounting recess 44 of the casing main body 41. Once fitted in, the glass substrate 6 is locked therein by action of a frictional force.

A first dielectric multi-layer film 64 formed by depositing a dielectric material such as titanium oxide is formed on the left surface of the first glass substrate 61 or the right surface of the second glass substrate 62, and a second dielectric multi-layer film 65 is formed on the left surface of the second glass substrate 62 or the right surface of the third glass substrate 63. The composition and thickness of the first dielectric multi-layer film 64 are set so that the film 64 causes lights having a wavelength of the light emitted from the LED 54 to transmit and reflects lights having other wavelengths. Contrary to this, the composition and thickness of the second dielectric multi-layer film 65 are set so that the film 65 reflects at least electroluminescent lights.

The first and second light detecting elements 521, 531 are so arranged that the light emitted from the LED 54 acts as follows. The light emitted from the LED 54 propagates toward the bottom surface of the second glass substrate 62 and is then diffusely reflected at the projection spot P (see FIG. 6) on the surface of the bank note M being held in sliding contact with the bottom surface of the second glass substrate 62. Vertical components of the diffusely reflected light propagating upward are detected by the second light detecting device 531, and vertical components of the electroluminescent light created on the bank note M at the projection spot P are reflected at right angles by the first dielectric multi-layer film 64 to become horizontal components. The electroluminescent light horizontally propagating to the left is reflected at right angles by the second dielectric multi-layer film 65 to propagate upward and to be detected by the first light-detecting device 521.

Vertical components of the electroluminescent light created on the bank note M at a position (monitor spot P1) slightly leftward from the projection spot P are reflected at right angles by the first dielectric multi-layer film 64 to become horizontal components and the electroluminescent light horizontally propagating to the left are further reflected at right angles by the second dielectric multi-layer film 65 to propagate upward, and detected by the third light detecting element 522 after being refracted by a lens member to be described later.

ITO films 66 formed by depositing ITO (indium-tin-oxide) which is an oxide of an indium-tin alloy are formed on the rear surface of the glass substrate 6 in contact with the bank note M and the vertical right surface thereof. Another electrode for creating an alternating-current electromagnetic field in the note transport path 95 is formed by the ITO films 66 (one electrode is formed by the insulating ring 33 of the roller member 3). Particularly on the rear surface of the glass substrate 6, a strong transparent insulating film 67 made of an alumina coating or a diamond coating is further placed on the ITO film 66. The presence of this transparent insulating film 67 prevents the ITO film 66 from being damaged by abrasion of the bottom of the glass substrate 6. Further, the transparent insulating film 67 prevents the ITO film 66 and the metallic ring 34 from coming into direct contact when no bank note is present in the note transport path 95, thereby preventing an occurrence of electrical shorting.

In this embodiment, a lens member 68 and a mask 69 for covering the bottom surface of the lens member 68 are provided between the glass substrate 6 and the first and second light detecting devices 52, 53 as shown in FIGS. 3, 5 and 6.

The lens member 68 is made of a glass or transparent plastic. Although the lens member 68 is made of a glass in this embodiment, the present invention is not limited to the lens member 68 made of a glass. It may be made of a synthetic resin. Such a lens member 68 is adapted to gather the lights from the projection spot P and the monitor spot P1 to the respective light detecting elements 521, 522, 531 to increase amounts of light detected thereby and is comprised of a glass plate 68*a* rectangular in plan view, a first convex lens 68*b* bulging from the glass plate 68*a* and facing the first light detecting element 521, and a second convex lens 68*c* facing the second light detecting element 531. Radii of curvature of the first and second convex lenses 68*b*, 68*c* are so set that the focusing planes thereof are located on the first and second light detecting elements, respectively.

The mask 69 is adapted to cut unnecessary ones of the lights propagating toward the first and second light detecting devices 52, 53 via the lens member 68 from the glass substrate 6.

In this embodiment, the first detecting construction 71 (see FIG. 5) for detecting the security mark M3 printed using the electroluminescent ink containing the electroluminescent material is constructed by the alternating-current power supply 30, the roller member 3, the lead plate 35, the glass substrate 6, the first convex lens 68*b* and the first light detecting device 521, and the second detecting construction 72 (see FIG. 6) for detecting the usual ink portion M32 printed on the electroluminescent ink or near the electroluminescent ink using the usual ink is constructed by the LED 54, the glass substrate 6, the second convex lens 68*c* and the second light detecting device 531. Further, the third detecting construction 73 is constructed by the alternating-current power supply 30, the roller member 3, the lead plate 35, the glass substrate 6, the first convex lens 68*b* and the third light detecting element 522.

According to the present invention, a light intensity detected by the third detecting construction 73 is corrected based on a difference between it and a reference light intensity set beforehand, and the genuineness of the bank note M is discriminated based on the corrected light intensity.

Before describing such a correction of the light intensity, printing made on the bank note M to be discriminated is described. FIG. 7 is a perspective view showing an exemplary printed state of the bank note M. FIG. 8A is an enlarged section along C-C of FIG. 7.

The security mark M3 and the monitor mark M4 as well as a multitude of various characters, figures and/or symbols are printed on the surface of the bank note M. In an example of FIG. 7, the security mark M3 is formed by a letter "S" and a "horizontal bar" intersecting with the letter "S". The bank note M inserted into the note transport path 95 (see FIG. 1) of the discriminating apparatus 1 is pulled toward the back of the note transport path 95 by the rotation of the transport rollers 95*c* (see FIG. 2), and a portion of the bank note M indicated by phantom line in FIG. 7 is successively scanned by a relative movement of the light detecting devices 51 with respect to the bank note M.

Specifically, the light projected onto the projection spot P (see FIG. 6) of the bank note M from the LED 54 and reflected by the surface of the bank note M is detected by the second light detecting element 531 as time passes, and the light emitted from the electroluminescent ink at the projection spot P caused by the inside of the note transport path 95 becoming an alternating-current electromagnetic field is detected by the first light detecting device 521 as time passes. Further, the light emitted from the electroluminescent ink at the monitor spot P1 is detected by the third light detecting element 522 as time passes. The genuineness of the bank note M is discriminated by the control unit 8 based on the detection results of the first and second light detecting devices 52, 53.

Such a bank note M is, as shown in FIG. 8A, comprised of a base sheet M1, a coating layer M2 formed on the outer surface of the base sheet M1 by applying coating of a specified coating material in order to smoothen a printing surface, the security mark M3 formed by applying printing to the surface of the coating layer M2 and the monitor mark M4 provided near the security mark M3. The security mark M3 is formed in a position corresponding to the projection spot P, and the monitor spot M4 is formed in the shape of a straight line extending in forward and backward directions so as to correspond to the horizontal bar of the security mark M3 in a position corresponding to the monitor spot P1.

The security mark M3 is made of the electroluminescent ink portion M31 printed by the electroluminescent ink and the usual ink portion M32 formed by applying the usual printing ink on the electroluminescent ink portion. An ink which causes the electroluminescent light to transmit and has a wavelength different from that of the electroluminescent light is adopted as the ink of the usual ink portion M32.

When the bank note M having a security mark M3 formed thereon is inserted into the note transport path 95 of the discriminating apparatus 1, the unillustrated sensor detects it and the roller member 3 and the lead plate 35 in the note transport path 95 are set in an environment of an alternating-current electromagnetic field by power supply from the alternating-current power supply 30 in response to sensor detection, and the LED 54 emits a light. In this state, the bank note M is introduced between the metallic ring 34 of the roller member 3 and the glass substrate 6 by the rotation of the transport rollers 95*c* (see FIG. 6) and passes through the note transport path 95 while being held in sliding contact therewith, thereby being scanned by the light detecting devices 51.

When the security mark M3 and the monitor mark M4 (see FIGS. 7 and 8A) of the bank note M reach the projection spot P and the monitor spot P1 (see FIG. 6) in the note transport path 95 during scanning, the monitor mark M4 and the electroluminescent ink portion M31 emit the electroluminescent lights since the environment of the alternating-current electromagnetic field is set at these positions. The electroluminescent light emitted from the monitor mark M4 propagates in a zigzag manner by being reflected by the first and second dielectric multi-layer films 64 and 65 of the glass substrate 6 to be detected by the third light detecting device 522 via the first convex lens 68*b*. Further, the electroluminescent light from the electroluminescent ink portion M31 likewise propagates in a zigzag manner in the glass substrate 6 to be detected by the first light detecting element 521 via the first convex lens 68*b*

On the other hand, the light emitted from the LED 54 is projected onto the usual ink portion M32 of the security mark M3 at the projection spot P after transmitting through the first dielectric multi-layer film 64, and vertically reflected components thereof are detected by the second light detecting element 531.

FIG. 8A is an enlarged section along C-C of FIG. 7, FIG. 8B is an another embodiment of an enlarged section of FIG.7, essentially FIG. 8A with M4 monitor mark elided. FIG. 8C shows a state where printing is made by a mixed ink obtained by mixing the electroluminescent ink with the usual nonluminescent ink.

Where the printed protuberant portion M3 (see FIGS. 7, FIG. 8A, FIG. 8B, FIG. 8C) of the bank note M reaches the projection spot P (see FIG. 6) in the note transport path, the electroluminescent ink portion M31 (See FIG. 8B) or the electroluminescent ultrafine particles M31' (see FIG.8C) emit a light since the environment of the alternating current electromagnetic field is set at this position. The emitted electroluminescent light propagates at a zigzag manner by being reflected by the first and second dielectric multi-layer film 64 and 65 of the glass substrate 61 to be detected by the first light detecting element 52 (see FIG. 6). Further a light from the LED 54 is projected onto the usual ink portion M32 or the ink base M32' at the same position as above after transmitting through the first dielectric multi-layer film 64, and the vertical components of the reflected light are detected by the second light detecting element 53.

FIGS. 9A and 9B show changes of output values in proportion to amounts of light detected by the first, second and third light detecting elements 521, 531 and 522 over time during the scanning by the light detecting devices 51, wherein FIG. 9A is a partial enlarged view of the bank note M and FIG. 9B is a graph showing changes of the output values of the respective light detecting elements over time. In FIG. 9A, the bank note M is inverted from the state of FIG. 7 in order to conform to changes of the output values over time shown in FIG. 9B. Thus, upper and lower sides of FIG. 9A correspond to left and right sides of FIG. 7.

The graph of FIG. 9B shows a change of the output values of the first light detecting element 521 corresponding to the electroluminescent ink portion M31 over time at its upper part, a change of the output values of the second light detecting element 531 corresponding to the usual ink portion M32 over time at its middle part and a change of the output values of the third light detecting element 522 corresponding to the monitor mark M4 over time at its lower part, respectively.

In FIG. 9A, the bank note M is moved to left, whereby the electroluminescent light from the monitor mark M4 set slightly longer than the electroluminescent ink portion M31 of the security mark M3 is first detected by the third light detecting element 522, the electroluminescent light from the electroluminescent ink portion M31 is then detected by the first light detecting element 521 and then the light emitted from the LED 54 and reflected by the usual ink portion M32 is detected by the second light detecting element 531. Thereafter, the first and second light detecting elements 521, 531 alternately and repeatedly make detections depending on which of the electroluminescent ink portion M31 or the usual ink portion M32 is located at the projection spot P. During this time, detection of the third light detecting element 522 is continued for a period between $t_1$ and $t_2$.

In this embodiment, the electroluminescent ink portion M31 is printed using an electroluminescent ink powder which is transparent in visible rays having the same reflectance as the base sheet of the bank note M, whereas the usual ink portion M32 is printed using a printing ink which has a denser color than the base of the bank note M and does not transmit the electroluminescent light. Accordingly, if the bank note M is placed in the environment of the alternating-current electromagnetic field, the electroluminescent ink portion M31 emits a blue light having a wavelength of, e.g. 450 nm, but this blue light is not emitted to the outside by being hindered by the usual ink in a portion thereof over which the usual ink portion M32 is formed.

The light emitted from the LED 54 becomes a negative reflected light at the usual ink portion M32 (i.e. light intensity of the reflected light is lower than that of the reflected light from the base of the bank note M since being denser than the base of the bank note M). Accordingly, as shown in FIG. 9B, the output values of the first and second light detecting elements 521, 531 change over time in the same manner during a period between $t_1$ and $t_2$.

The change of the output value of the first light detecting element 521 over time (first pattern) and that of the second detecting element 531 over time (second pattern) are compared with the patterns of the genuine bank note set beforehand in the control unit 8, the bank note M scanned by the discriminating apparatus 1 is discriminated to be genuine when a correlation between the first and second patterns and the corresponding patterns of the genuine bank note M is equal to or larger than a predetermined value.

Accordingly, in order to compare the first and second patterns of the bank note M being discriminated with those of the genuine bank note, it is a condition that the respective patterns of the genuine bank notes M do not largely vary. In the actual genuine bank notes M, the color tone of the security marks M3 may change depending on printing factories, printing apparatuses even if they are printed at the same printing factory, temperature and humidity variations and how long the bank notes have been used, etc. Under such circumstances, it is difficult to highly precisely discriminate the genuineness of the bank notes M. Particularly, a percentage of discriminating the genuine bank notes as counterfeit increases, which may lead to a fall in reliability of the discriminating apparatus 1.

Accordingly, in the present invention, the monitor mark M4 is so provided on the bank note M as to correspond to the security mark M3, and the output value corresponding to the electroluminescent ink portion M31 is corrected and converted into a standard one based on the output value of the third light detecting element 522.

The above arrangement is made for the following reason. Specifically, even if printing conditions and working conditions for the security mark M3 change, a variation of the printed state and a variation of color fading caused by the duration of use also occur to the monitor mark M4. Accordingly, by scanning the monitor mark M4 when the bank note M is scanned by the discriminating apparatus 1 and correcting an output value corresponding to the electroluminescent ink portion M31 of the security mark M3 so as to conform it to a reference output value of the genuine bank note, the security mark M3 can be constantly returned to a state where the variations of the printed state and the color fading are corrected. This solves a problem of discriminating a genuine bank note to be counterfeit.

FIG. 9C is a graph showing changes of output values in proportion to amounts of light detected by the first and second light detecting elements 52, 53 during the scanning by the light detecting elements 51 as time passes. This graph assumes a state where a center part of the letter "S" of FIG. 7 was scanned. A curve at the bottom of the graph is obtained by the first light detecting element 52, whereas the one at the upper part of the graph is obtained by the second light detecting element 53.

As can be seen from this graph, during a period between $t_0$ and $t_1$ during which the printed protuberant portion M3 is not scanned by the light detecting elements 51, the reflected light of the light from the LED 54 is detected only by the second light detecting element 53 since the surface of the bank note M has a basic color. Accordingly, an output in conformity with an amount of the reflected light is sent from the second light detecting element 53, whereas an output value from the first light detecting element 52 is "0".

On the other hand, the electroluminescent ink portion M31 emits a light during a period between $t_1$ and $t_2$ during which the printed protuberant portion M3 is scanned. This emitted electroluminescent light is detected by the first light detecting element 52, and the light projected from the LED 54 and reflected by the printed protuberant portion M3 is detected by the second light detecting element 53. Thus, detection signals are outputted from both the first and the second light detecting elements 52, 53. Specifically, patterns of the output values of the respective light detecting elements 52, 53 with the lapse of time should be substantially equal since the printed protuberant portion M3 formed by applying the usual ink on the electroluminescent ink is scanned during the above period ($t_1$ to $t_2$). In the present invention, genuineness of the bank note M is discriminated by calculating the identity of these patterns (degree of identity is called correlation) by a specified calculation processing.

The electroluminescent ink forming the electroluminescent ink portion M31 or electroluminescent ultrafine particles fundamentally emits a light in the environment of the alternating-current electromagnetic field, and has a property of creating a reflected light having a wavelength different from the light reflected by the usual ink forming the usual ink portion M32 or the ink base M32' also when a light from the LED 54 is projected thereto. Accordingly, even if the bank note M is not placed in the environment of the alternating-current electromagnetic field, two kinds of reflected lights can be obtained from the printed protuberant portion M3 by projecting the light from the LED 54 onto the surface of the bank note M, thereby enabling discrimination of genuineness described with reference to the graph of FIG. 9C.

FIG. 10A is a block diagram showing one embodiment of a control of correcting the output value corresponding to the electroluminescent ink portion M31 of the security mark M3 by the control unit 8. As shown in FIG. 10A, the genuineness discriminating control for the bank note M and the drive control of the discriminating apparatus 1 are executed by the control unit 8 provided internally with a CPU (central processing unit) 80. With the CPU 80 are connected a RAM (random access memory) 81 and a ROM (read only memory) 82.

The RAM 81 is an external storage device in and from which data can be freely written and read, and output values from the first and second light detecting elements 52, 53 with the lapse of time, results of specified calculation processings are inputted to the RAM 81 and, if necessary, various values including results of intermediate processings and calculations are outputted therefrom. The ROM 82 is an external storage device exclusively for reading purpose, and a program for performing a correction calculation for the electroluminescent ink portion M31 of the security mark M3 is stored in advance. Upon application of a power to the discriminating apparatus 1 by operating the power switch 96, the program in the ROM 82 is transferred to the CPU 80.

Every time the bank note M is inserted into the note transport path 95, the CPU 80 outputs drive signals to various devices and corrects the output value of the first light detecting element 521 corresponding to the electroluminescent ink portion M31 of the bank note M to be discriminated based on the output value (light intensity) of the third light detecting element 522 corresponding to the monitor mark M4 in accordance with the program. A LED control circuit 54*a* is provided between the control unit 8 and the LED 54. This LED control circuit 54*a* controllably turns the LED 54 on and off in accordance with a control signal from the control unit 8. Specifically, a control is executed to turn the LED 54 on when the unillustrated sensor detects insertion of the bank note M into the note transport path 95 and to turn the LED 54 off when the bank note M passes the note transport path 95.

A first amplifier 521*a* and a first analog-to-digital (A/D) converter 521*b* are provided in series between the first light detecting element 521 and the control unit 8; a second amplifier 531*a* and a second A/D converter 531*b* are provided in series between the second light detecting element 531 and the control unit 8; and a third amplifier 522*a* and a third A/D converter 522*b* are provided in series between the third light detecting element 522 and the control unit 8. The respective amplifiers 521*a*, 531*a*, 522*a* amplify feeble detection signals from the first, second and third light detecting elements 521, 531, 522 and the respective A/D converters 521*b*, 531*b*, 522*b* convert analog signals from the amplifiers 521*a*, 531*a*, 522*a* into digital signals.

Further, power is supplied to the roller member 3 and the lead plate 35 from the alternating-current power supply 30 via an inverter 37. The inverter 37 converts an alternating voltage supplied from the power supply 30 into an alternating voltage having a specified voltage value and a specified frequency and supplies it to the roller member 3 and the lead plate 35. The inverter 37 is turned on and off in accordance with a control signal from the CPU 80 and sets the voltage value and frequency when being turned on.

The output values of the first, second and third light detecting elements 521, 531, 522 thus processed are inputted to the control unit 8 after being digitized. The CPU 80 applies a specified calculation to the received output values to correct the digital output values of the first and second light detecting elements 521, 531 according to the digital output value of the third light detecting element 522, and discriminates the genuineness of the bank note M based on the corrected output values.

In order to perform such a processing, the CPU 80 is provided with a light intensity comparing means 80*a* for comparing the digital output value (light intensity) from the third light detecting element 522 with a reference light intensity stored beforehand in the RAM 81, and a light intensity converting means 80*b* for correcting the output values of the first and second light detecting elements 521, 531 based on a comparison result of the light intensity comparing means 80*a* and converting them into corrected output values. The CPU 80 is also provided with genuineness discriminating means 80*c* for discriminating the genuineness of the bank note M. This genuineness discriminating means 80*c* is so constructed as to discriminate genuineness by means of a specified calculation based on the output values of the first and second light detecting elements 521, 531 which were obtained by scanning the bank note M and corrected by the light intensity converting means 80*b*. The light intensity comparing means 80*a*, the light intensity converting means 80*b* and the genuineness discriminating means 80*c* are described in detail later with reference to FIG. 12A.

The discrimination result on the genuineness of the bank note M by the genuineness discriminating means 80*c* is outputted to the display lamp assembly 98, and the genuineness of the bank note M having passed through the note transport path 95 can be visually confirmed by seeing which of the success lamp 98*b* and the failure lamp 98*c* is on. Further, it can be confirmed by seeing the ready lamp 98*a* turned on that the certified paper discriminating apparatus 1 can receive the bank note M.

The control unit 8 is also provided with a drive control circuit 84 for outputting drive signals to various devices (the transport rollers 95*c*, unillustrated flappers, etc.) provided in the discriminating apparatus 1. The devices provided at the specified positions in the discriminating apparatus 1 operate while linking with each other in accordance with control signals sent from the control unit 8 via the drive control circuit 84.

A detection signal representing the rotating speed of the roller member 3 (specifically the number of stripes provided on the outer circumferential surface of the metallic ring 34 passing a detecting position per unit time) is inputted from the photoreflector 36 to the control unit 8, and a timing pulse corresponding to this input value is sent to the respective A/D converters 521*b*, 531*b*, 522*b* via an unillustrated timing pulse generating circuit, as later shown in FIG. 10B. This timing pulse generating circuit sends so-called timing signals representing specified periods used in converting an analog signal into a digital signal to the A/D converters 521*a*, 531*a*and 522*a*. A first analog value or an average analog value during the period defined by the timing signal is converted into a digital value.

In an alternative embodiment FIG. 10B a time pulse generating circuit 83 connects to 522B, 521B. 80C, a genuineness comparing means of FIG. 10A is omitted from the CPU 80 of FIG. 10B. The photoreflector 36 of 10A is not shown from FIG. 10B. A roller member 3 of FIG. 10A is not shown in FIG. 10B.

Next, the genuineness discrimination for the bank note M performed in the control unit 8 is described with reference to FIGS. 11A and 12A. FIG. 11B is an alternative embodiment of a flow chart showing a data sampling routine executed to store data on intensities of the lights detected by the light detecting elements. FIG. 11A is a flow chart showing a data sampling routine for scanning the surface of the bank note M by the light detecting devices 51, and FIG. 12A is a flow chart showing a correlation calculation routine for discriminating the genuineness of the bank note M based on the scanned data.

First, a procedure of storing photoelectrically converted output signals from the light detecting devices 51 (analog signals representing detections by the first and second light detecting elements 521, 531) in a specified storage device of the control unit 8 or the RAM 81 is described with reference to FIG. 11A. When the data sampling routine is started in Step S1, the CPU 80 calls the program stored in the ROM 82, starts implementing it and initializes the respective mechanisms (registers, counters, flappers, etc.) in accordance with the program (Step S2). Simultaneously, a control of the note transporting mechanism by the drive control circuit 84 is started. When this bank note M to be discriminated is inserted into the note transport path 95 in this state, the unillustrated sensor detects it, the CPU 80 outputs a signal to the transport rollers 95*c* via the drive control circuit 84 to drive them and also outputs drive signals to the inverter 37 and the LED control circuit 54*a*. Accordingly, a specified alternating voltage from the alternating-current power supply 30 is supplied to the roller member 3 and the lead plate 35 to set the note transport path 95 in the environment of the alternating-current electromagnetic field (Step S3), and a turn-on signal is outputted from the LED control circuit 54*a* to turn the LED 54 on (Step S4).

Subsequently, the bank note M inserted into the note transport path 95 advances in the note transport path 95 by the rotation of the transport roller 95*c* to come into a clearance between the bottom surface of the glass substrate 6 and the outer circumferential surface of the roller member 3, and the roller member 3 is rotated about the center axis 31. The rotating speed of the roller member 3 is detected in the form of a pulse signal corresponding to the stripe pattern which signal is obtained by projecting a light onto the outer circumferential surface of the metallic ring 34 having the stripe pattern and receiving a reflected light by the photoreflector 36, and the analog output values of the first to third light detecting elements 521, 531, 522 are converted into digital signals by the respective A/D converters 521*b*, 531*b*, 522*b* after being amplified by the first to third amplifiers 521*a*, 531*a*, 522*a* in synchronism with the pulse signal in accordance with control signals from the CPU 80 based on the detection result (Step S5).

Amplification factors of the first to third amplifiers 521*a*, 531*a*, 522*a* are set at initial values in advance. An analog light intensity (i.e. light intensity of the monitor mark M4) from the initialized third amplifier 522*a* is digitally converted into a monitor light intensity PD3 by the third A/D converter 522*b*, and this monitor light intensity PD3 is compared with a reference light intensity th stored in the RAM 81 beforehand (Step S6). The reference light intensity th is set at a minimum presumable value of the light intensity from the electroluminescent ink portion M31 of the bank note M.

In Step S6, it is discriminated whether the monitor light intensity PD3 is equal to or larger than the reference light intensity th. Step S7 and subsequent steps are carried out upon judgment that the third light detecting element 522 is detecting the light emitted from the monitor mark M4 if PD3≧th, and a digital light intensity from the first light detecting element 521 (corresponding to the electroluminescent ink portion M31) is stored as a data in the storage device after being converted into a corrected light intensity. On the other hand, if PD3<th, this routine returns to Step S3 after proceeding to Step S13 upon judgment that the third light detecting element 522 is not detecting the light from the monitor mark M4 (i.e. the monitor mark M4 is not present at the monitor spot P1).

In Step S7, the light intensity comparing means 80*a* calculates a deviation of the monitor light intensity PD3 from the reference light intensity th, and the light intensity converting means 80*b* calculates a ratio of this deviation to the reference light intensity th, which ratio is then set at an amplification factor (gain) (Step S8). Subsequently, the CPU 80 receives the outputs from the first and second light detecting elements 521, 531 at a timing of receiving the pulse signal from the photoreflector 36, and successively stores multiples of the respective output values by the above gain as corrected output values (the corrected output value from the first light detecting element 521 as a first corrected output value PD1, and the corrected output value from the second light detecting element 531 as a second corrected output value PD2) in a specified storage device (e.g. RAM 81) (Step S10).

The above output values are stored as follows. Specifically, a first working area for temporarily saving the first corrected output value PD1 from the first light detecting element 521 and first storage areas the first corrected values PD1 are set beforehand in the storage device. For the digital signals from the second light detecting element 531, a second working area for temporarily saving the second corrected output value PD2 and second storage areas D1(j) (j(storage address)=1 to n) for successively storing the second corrected output values PD2 are likewise set beforehand in the storage device.

Every time the first and second corrected output values PD1, PD2 are sent from the first and second light detecting elements 521, 531, the values thereof are successively (i=i+1, j=j+1) stored in the first and second storage areas D1(i), D2(j) while successively shifting the storage addresses by counting the pulse signals outputted from the photoreflector 36 (Step S10 to S12). When the passage of the trailing end of the monitor mark M4 at the monitor spot P1 (see FIG. 6) is detected based on the count result of the signals from the photoreflectors 36 (Step S13), scanning of the bank note M is completed upon judgment that data sampling has been completed. In this way, the light intensities of the security mark M3 scanned by the first and second light detecting 521, 531 are corrected into the first and second corrected output values PD1, PD2 based on the gain obtained by comparing the monitor light intensity PD3 detected by the third light detecting element 522 with the reference light intensity th, and the genuineness of the bank note M is discriminated based on the corrected output values PD1, PD2 stored in the first and second storage areas D1(i), D2(j) while successively shifting the storage addresses. Thus, an inconvenience of discriminating the genuine bank notes M to be counterfeit due to the varying printed state of the ink of the security mark M3, color fading caused by the use of long duration, and other causes can be securely prevented, thereby improving a rate of discriminating genuine bank notes M as genuine.

FIG. 11B shows the alternative embodiment of 11A with Step S1 the start of a data sampling routine, Step S2 initialization, Step S3 emit LED, Step S4 convert AND, Step S5 query end?, Step 6 store data, Step 7 (see Step 12 of 11B ) i.e. in the earlier step prior to Step 7 it is discriminated whether the monitor light intensity PD3 is equal to or larger than the reference light intensity th the values thereof are successively (i=i+1, j =j+1) stored in the first and second storage areas D1(i), D2(j) while successively shifting the storage addresses by counting the pulse signals outputted from the photoreflector 36), Step 8 end sampling and Step 9 end.

Upon completion of scanning of the bank note M, the correlation calculation routine is executed to discriminate the genuineness of the bank note. This calculation is performed by the genuineness discriminating means 80*c*. This routine is described below with reference to FIG. 12A. At a stage where this routine is executed, n corrected values of the light intensities from the first and second light detecting elements 521, 531 are stored in the first and second storage areas D1(i), D2(j), respectively.

Upon start of the correlation calculation (Step S20), the data in the first and second storage areas D1(i) and D2(j) of the RAM 81 are read by the genuineness discriminating means 80*c* (Step S21). Binary processing is applied to the respective read data (Step S22). Subsequently, an absolute value Dn of a difference between the thus obtained binary data corresponding to each address is calculated, and this operation is repeated for all the stored data (Step S23 to S25).

Upon completion of the above operation (YES in Step S25), a total sum D of the absolute values Dn of the respective differences is calculated (Step S26), and the total sum D is compared with a very small value α set beforehand (Step S27). If D <αas a result of this comparison, the genuineness discriminating means 80*c* discriminates the bank note M to be genuine upon judgment that the two patterns detected by the first and second light detecting elements 521, 531 coincide (Step S28). On the other hand, if D>α, the bank note M is discriminated to be counterfeit (Step S29).

In order to further improve the precision of the genuineness discrimination for the bank note M, calculation may be performed using data comprised of three or more digits. Further, not only the two patterns (detection patterns of the electroluminescent ink portion M31 and the usual ink portion M32 by the first and second light detecting elements 521, 531 over time (see FIG. 9B)) are compared, but they may be also compared with specific patterns stored beforehand in the ROM 82 to make a more precise discrimination on genuineness. In addition, the two patterns may be compared by calculating ratios thereof instead of calculating differences between them.

As described in detail above, according to the present invention, the monitor mark M4 is used to measure a luminance (intensity of light emission) of the light emitted from the electroluminescent ink, and a luminance of the light emitted from the electroluminescent ink portion M31 of the security mark M3 is corrected based on the luminance of the light from the monitor mark M4. Accordingly, variation of light emission from the electroluminescent ink portion M31 due to the state of ink during printing, color fading caused by the use of long duration, etc. is solved, thereby improving precision of the genuineness discrimination.

Although the special monitor mark M4 is provided for monitoring purpose separately from the security mark M3 in the foregoing embodiment, it may be hidden in the security mark M3. Alternatively, a leading end portion of the security mark M3 may be used as the monitor mark M4. In such a case, a luminance of the first electroluminescent light from the security mark M3 may be stored and the detected light intensity may be corrected based on the stored luminance. This eliminates the need for providing the special monitor mark M4.

Further, instead of changing the amplification factors of the amplifiers 521*a*, 531*a*, the same effect can be accomplished by changing an output voltage value and an oscillation frequency of a circuit of the inverter 37 of FIG. 10A. Furthermore, if a monitor mark is also set for the usual ink and a reflected light therefrom is detected to detect a change in the state of ink due to, e.g. abrasion and color fading, and correction is accordingly made based on the detection result, an even more precise genuineness discrimination can be realized.

Although the electroluminescent light from the electroluminescent ink portion M31 of the bank note M and the light emitted from the LED 54 and reflected by the usual ink portion M32 are respectively detected by the first and second light detecting elements 521, 531 in the foregoing embodiment, they may be both detected by one light detecting element and data on the security mark M3 may be stored in the first and second storage areas D1(i) and D2(j). However, in this case, it is necessary to provide a time shift between data sampling of the electroluminescent light from the electroluminescent ink portion M31 and data sampling of the reflected light from the usual ink portion M32.

As shown in the alternate embodiment FIG. 12B of the correlation calculation flow, at a stage where this routine is executed, n digital signals from the first and second light detecting elements 52, 53 are stored in the first and second storage areas D1(i), D2(j), respectively.

Upon start of the correlation calculation (Step S10), addresses (i=a to a+k) where the data detected by the first light detecting element 52 for detecting the electroluminescent ink and stored in the first storage area D1(i) the values of which data are larger than a predetermined threshold value α are extracted (Step S11, i.e. extract address (i=a to a+k) where PD1,) Subsequently, addresses (=b to b+k) in the second storage area D2(j) storing the data from the second light detecting element 53 and corresponding to the above addresses (i=a to a+k) are obtained (Step S12 essentially, extract the address where the PD2 data corresponding to the address (i=a to a+k) is stored) After a, b are newly replaced by i, j (Step S13), differences (AD1(i) and AD2(j) between the data in the adjacent addresses are calculated for the first and second storage areas D1(i) and D2(j) (Step S14). By calculating such differences, only the pattern printed on the bank note M can be effectively detected by removing variations of the electroluminescent light and the light from the LED which moderately changes during the transport of the bank note M and sensitivity differences of the light detecting elements 51 and the circuits.

Subsequently, absolute values of the differences between AD1(i) and AD2(j) are successively calculated and stored in H(1) (Step S15). The above operation is repeated until i, j become larger than a+k, b+k, respectively (Steps S14 to S17). Values of H(1) are totaled upon completion of the repeated operations (Step S18). The correlation calculating means 80*a* (see FIG. 10A) is so constructed as to perform the operations of Steps S11 to S18).

The above total value is compared with a predetermined genuineness reference value ϵ and the bank note M is discriminated to be genuine if the total value is equal to or smaller than ϵ (Step S20) while being discriminated to be counterfeit if it is larger than ϵ (Step S21) and then this routine ends (Step S22). The genuineness discriminating means 80*b* is so constructed as to perform the operations of Steps S19 to S21.

Hereinafter, a case where the electroluminescent light and the reflected light of the LED light are detected by one light detecting element is described with reference to FIG. 13. FIG. 13 is a flow chart showing one embodiment of the case where data sampling of the security M3 is performed by one light detecting element. Although reference is made to FIG. 10A for description based on FIG. 13 when necessary, the first and second light detecting elements 521, 531, the first and second amplifiers 521*a*, 531*a* and the first and second A/D converters 521*b*, 531*b* in FIG. 10A are replaced by one light detecting element, one amplifier and one A/D converter in this embodiment. Reference is also made to other FIGURES when necessary if the elements of this embodiment are the same as those of the foregoing embodiment.

As shown in the flow chart of FIG. 13, when the data sampling routine is started (Step S30), the CPU 80 starts implementing the program, initializes the respective devices, sets the transport mechanism to an operation standby state, and clears or initializes various counters, flags and registers (Step S31).

Subsequently, when the bank note M is inserted into the note transport path 95, the sensor detects it and the CPU 80 outputs a signal to start the transport of the bank note M, a signal to the inverter 37 to start oscillation and then a signal to the amplifier to set an amplification factor of the amplifier at a higher value to detect the electroluminescent light (Step S33).

When the bank note M inserted into the note transport path 95 (see FIG. 1) reaches the projection spot P (see FIG. 6), the roller member 3 is rotated as the bank note M is transported, and a pulse signal synchronizing with a transport speed of the bank note M is outputted from the photoreflector 36 to the CPU 80. During this time, the amplifier amplifies the output of the light detecting element in synchronism with the pulse signal from the photoreflector 36 and the A/D converter digitizes the amplified signal (Step S34).

Subsequently, the output (monitor light intensity PD3) of the third light detecting element 522 is compared with the reference light intensity "th" stored beforehand in the RAM 81 (Step S35). If PD3 is greater than or equal to the reference light intensity "th", this routine proceeds to Step S36 upon judgment that the third light detecting element 522 of FIG. 10A has detected the light emitted from the electroluminescent ink portion M3 1. Then, a gain is calculated and set as in the foregoing embodiment by comparing the monitor light intensity PD3 and the reference light intensity "th" (Steps S36 and S37), and corrected output values PD corresponding to the electroluminescent ink portion M31 corrected based on this gain are stored in the first storage areas D1(i) (Step S39).

On the other hand, if PD3<th, operations of Steps S32 to S35 are repeated after proceeding to Step S49 upon judgment that the third light detecting element 522 has not yet detected the electroluminescent light.

When the corrected output values PD are stored in the first storage areas D1(i) in Step S39, the CPU 80 counts pulses outputted from the photoreflector 36 (Step S40) and outputs a signal to the inverter 37 to stop of the oscillation of the alternating voltage from the circuit after adding a variable 1 (Step S41). In this way, driving of the inverter 37 is stopped (Step S42). A flow up to Step S42 is for storing the data on the light emitted from the electroluminescent ink portion M31 in the first storage areas D1(i).

Subsequently, a flow for storing the data on the light emitted from the LED 54 and reflected by the usual ink portion M32 in the second storage areas D2(j) is started in Step S44. Specifically, in order to detect the pattern of the usual ink portion M32, the CPU 80 outputs a control signal to the LED control circuit 54*a* to thereby turn the LED 54 on (Step S43). In this case as well, a gain is likewise set for the LED light detected by the light detecting element (Step S44), A/D conversion is applied to the obtained amplified light intensity (Step S45) to calculate the corrected output values PD of the reflected light, which are successively stored in the second storage areas D2(j) (Step S46).

Subsequently, the CPU 80 counts pulses from the photoreflector 36 (Steps S47, S48), discriminates the presence or absence of the pulse output from the photoreflector 36 during a predetermined period (Step S49). In the absence of the pulse output, this routine ends (Step S50) upon judgment that the transport of the bank note M has been completed. In the presence of the pulse output, this routine returns to Step S32 to repeat the succeeding operations.

By alternately detecting the light intensities corresponding to the electroluminescent ink portion M31 and the usual ink portion M32 according to the pulses from the photoreflector 36, data used to discriminate genuineness can be stored in the first and second storage areas D1(i) and D2(j) although only one light detecting element is used. FIGS. 14A and 14B show another embodiment of the security mark, wherein FIG. 14A is a partial enlarged view of the bank note M and FIG. 14B is graphs showing changes of output values from the respective light detecting elements over time. In this embodiment, as shown in FIG. 14A, a security mark M3' is comprised of a second usual ink portion M33 printed using a usual nonluminescent ink in addition to the electroluminescent ink portion M3 and the usual ink portion M32 printed one over the other as in the foregoing embodiment. The second usual ink portion M33 is adjacent to the ink portions M31, M32 printed one over the other along widthwise direction at a side opposite from the monitor mark M4.

In an example shown in FIG. 14A, a letter of "C" of the usual ink portion M32 and a letter of "A" of the second usual ink portion M33 can be seen, but a letter of "E" of the electroluminescent ink portion M31 and the bar-shaped monitor mark M4 cannot be seen by the naked eye since they are printed using an electroluminescent ink having a spectral property similar to the reflection characteristic of the basic sheet of the bank note M.

On the other hand, a light detecting device 51' is, as shown in FIG. 14A, provided with a fourth light detecting element 532 for detecting a reflected light from the second usual ink portion M33 in addition to the first to third light detecting elements 521, 531, 522 of the foregoing embodiment.

By scanning such a security mark M3' by the light detecting device 51', output values as shown in FIG. 14B can be obtained from the respective light detecting elements 521,522,531,532.

Specifically, a top graph of FIG. 14B shows a change of the output value of the reflected light from the second usual ink portion M33 detected by the fourth light detecting element 432 over time. In a middle graph, the output values of the light emission from the electroluminescent ink portion M31 detected by the first light detecting element 521 are indicated by dotted line while the output values of the reflected light from the usual ink portion M32 detected by the second light detecting element 531 are indicated by solid line. A bottom graph shows a change of the output values of the light emission from the monitor mark M4 detected by the third light detecting element 522 over time.

Precision in discriminating the genuineness of the bank note M can be further improved by providing the second usual ink portion M33 printed using the usual nonluminescent ink as part of the security mark M3' in addition to the electroluminescent ink portion M31 and the usual ink portion M32.

According to the present invention, the certified paper is printed with the security mark using both the luminescent ink which emits a light upon being placed in the specified environment and the usual nonluminescent ink, and/or the monitor mark used to monitor the printed tone of the security mark in vicinity of the security mark using the luminescent ink. Thus, by scanning the monitor mark emitting a light in the specified environment when letting the specified certified paper discriminating apparatus in which the reference light intensity is stored beforehand scan the security mark of the certified paper, the printed tone of the security mark can be known by a comparison of the light intensity of the scanned monitor mark with the reference light intensity. Thus, a correction can be made based on the comparison result of the scanned security mark, with the result that data on the intensities of the lights from the security mark can be standardized.

Accordingly, an inconvenience residing in the prior art that precision of discrimination of the certified paper based on the varying light intensity data from the scanned security mark is lower due to such a variation can be solved, thereby improving precision in discriminating the genuineness of the certified paper.

Further, the monitor mark made of the luminescent ink of the certified paper fed into the discriminating apparatus emits a light upon being placed in the specified environment, and this light emission is detected by the third light detecting element. The light intensity corresponding to the monitor mark detected by the third light detecting element is compared with the reference light intensity set beforehand to calculate the deviation by the light intensity comparing means, and the output value from the first light detecting element is converted into the corrected output value corresponding to the deviation based on the calculation result by the light intensity converting means. The genuineness of the certified paper is discriminated based on the corrected output value by the genuineness discriminating means.

In this way, prior to discrimination of the genuineness of the certified paper, an electrical signal representing a standard density obtained by correcting the density of the luminescent ink of the printed monitor mark is sent to the genuineness discriminating means, which then makes a specified genuineness discrimination. Thus, such an inconvenience that different printed states of the luminescent ink on the certified papers influence a result of genuineness discrimination can be solved, thereby constantly realizing a proper genuineness discrimination.

Further, the environment of the alternating-current electromagnetic field created upon application of an alternating voltage is adopted as the specified environment and the electroluminescent ink which emits a light in the environment of the alternating-current electromagnetic field is adopted as the luminescent ink. Since the electroluminescent ink is nonluminescent and colorless in a usual environment while emitting a light in the environment of the alternating-current electromagnetic field, the certified papers can be normally used without any trouble while the electroluminescent ink effectively performs its function in discriminating genuineness.

FIG. 15 is a diagram showing another example of the arrangement of the first and second detecting elements.

Although the genuineness of the bank note M is discriminated based on the correlation of the output values from the first and second light detecting elements 52, 53 obtained by comparing them in the foregoing embodiments, such a discrimination may be instead made as follows. Light detection patterns of the first and second light detecting elements 52, 53 over time for a genuine bank note M are stored beforehand as reference patterns, light detection patterns of the first and second light detecting elements 52, 53 over time and the reference patterns stored beforehand are compared every time a bank note to be discriminated is fed to the discriminating apparatus 1 to discriminate the genuineness thereof, and the bank note is discriminated to be genuine when the patterns are assumed to be same within a specified permissible range.

In the case of adopting such a discriminating method, the control unit 8 is provided with a reference pattern storage for storing reference light detection patterns of a genuine bank note, a comparing means for comparing the output values from the first and second light detecting elements 52, 53 and the reference patterns, and a genuineness discriminating means for discriminating the genuineness of a certified paper based on the comparison result of the comparing means.

Further, both the first and the second light detecting elements 52, 53 are so constructed as to detect the light from the same position (projection spot P) of the bank note M in the foregoing embodiments. Instead, light detecting positions of the first and second light detecting elements 52, 53 may be spatially displaced in forward and backward directions (advancing direction of the bank note M) as shown in FIG. 15. However, in this case, a spatial displacement needs to be temporally compensated. For example, light detection of the first light detecting element 52 may be caused to correspond to that of the second light detecting element 53 made after the lapse of a specified period. With this arrangement, the same effect as the one obtained when the first and second light detecting elements 52, 53 detect the light at the same position can be obtained while avoiding an inconvenience of arranging the first and second light detecting elements 52, 53 in a narrow place.

BRIEF DESCRIPTION OF THE DRAWINGS

FIGS. 9A and 9B show changes of output values in proportion to amounts of light detected by first and second light detecting elements during scanning by a light detecting device with the lapse of time, wherein FIG. 9A is a partial enlarged view of the bank note M and FIG. 9B is graphs showing changes of the output values of the respective light detecting elements over time.

Figure 1:
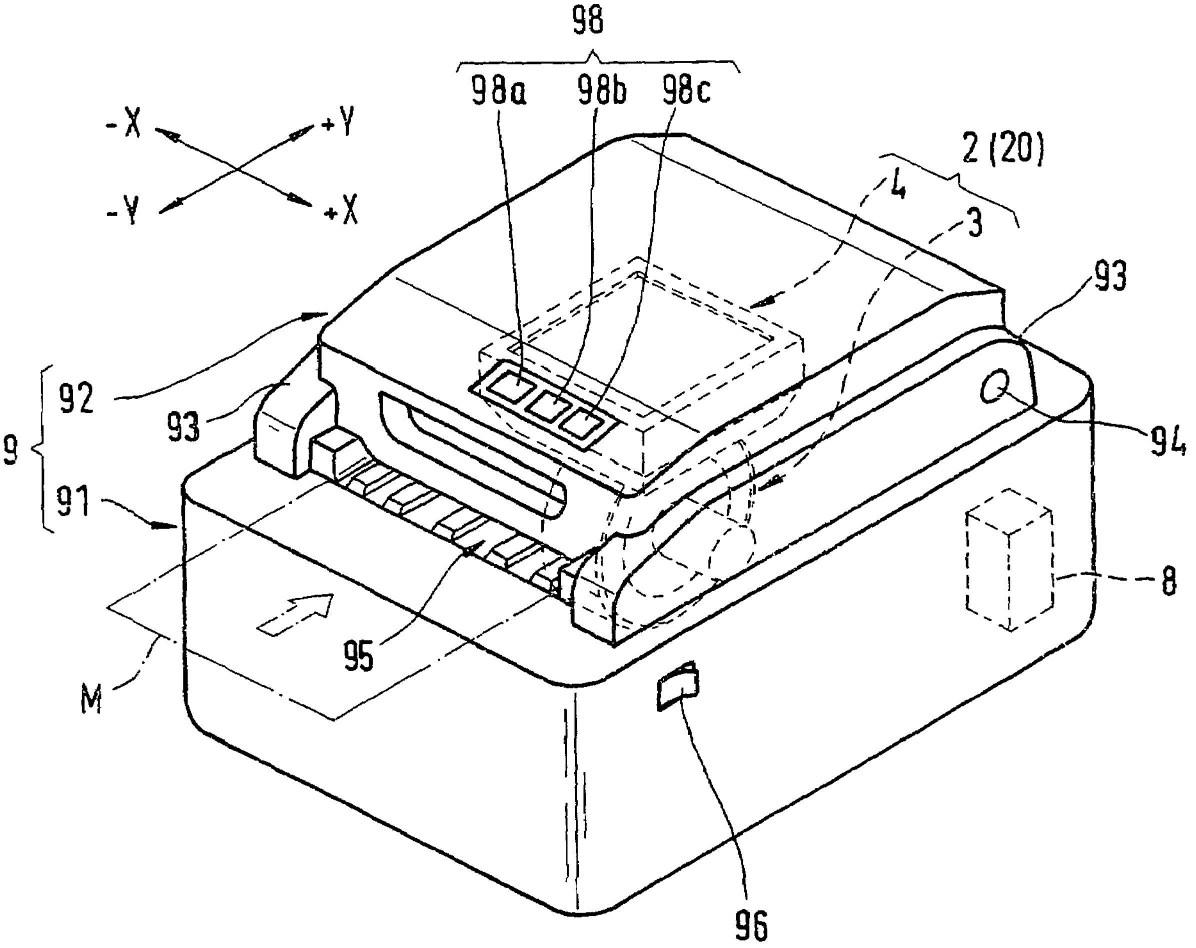
FIG. 1 is a perspective view showing one embodiment of a certified paper discriminating apparatus according to the present invention in a state where a lid of a casing is closed.
Figure 2:
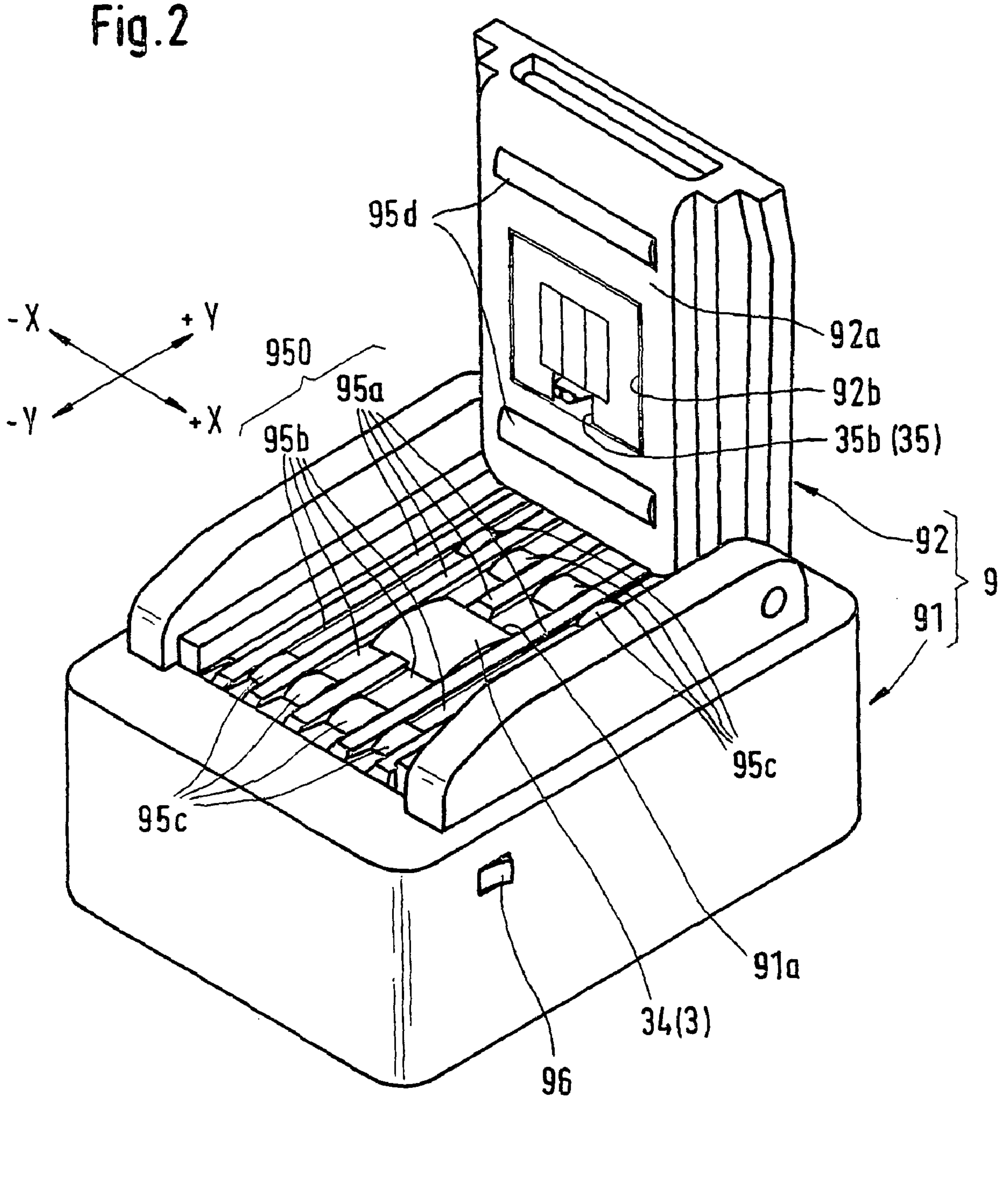
FIG. 2 is a perspective view of the certified paper discriminating apparatus of FIG. 1 in a state where the lid of the casing is open.
Figure 3:
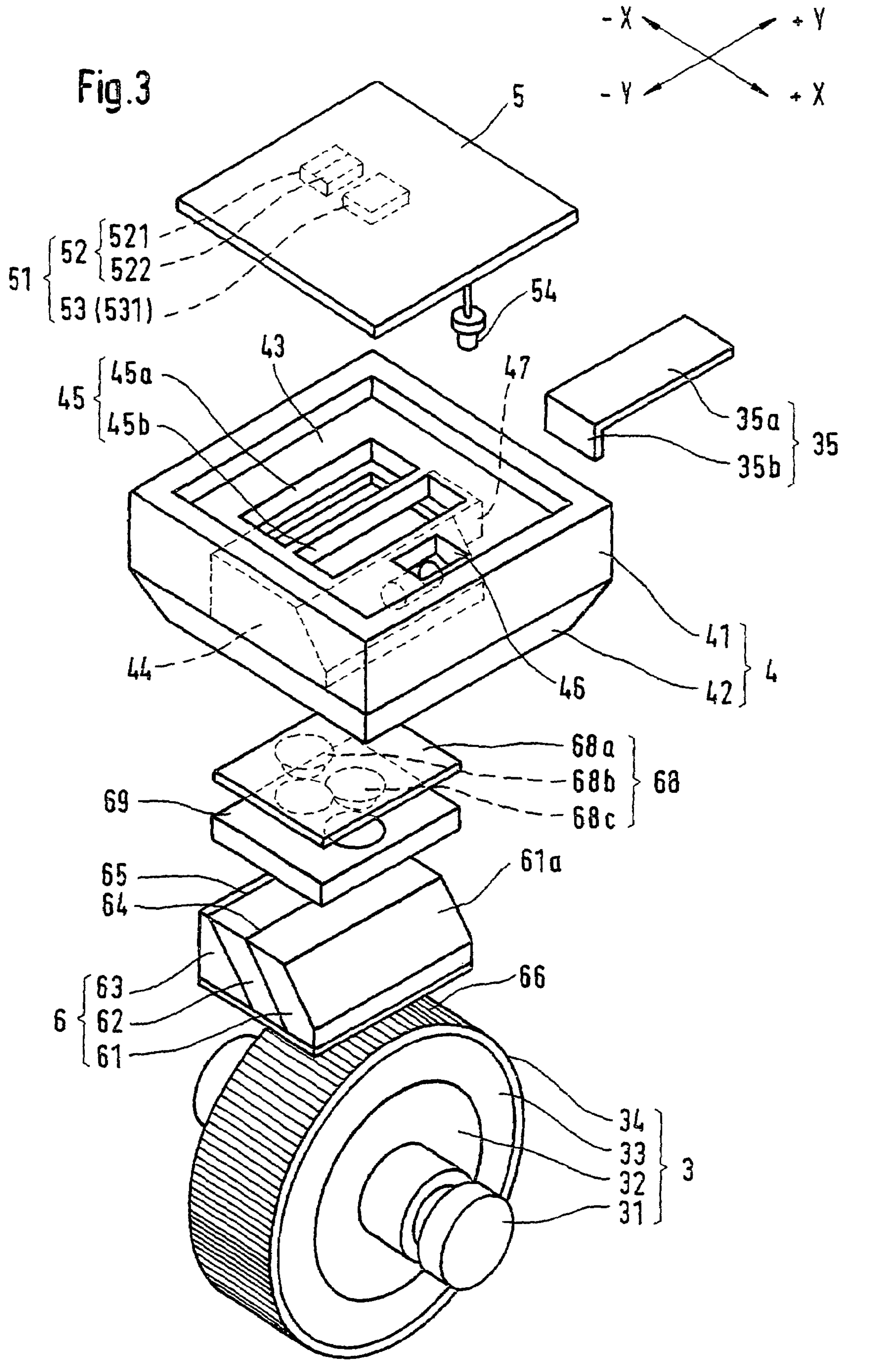
FIG. 3 is an exploded perspective view showing one embodiment of an apparatus main body contained in the casing.
Figure 4:
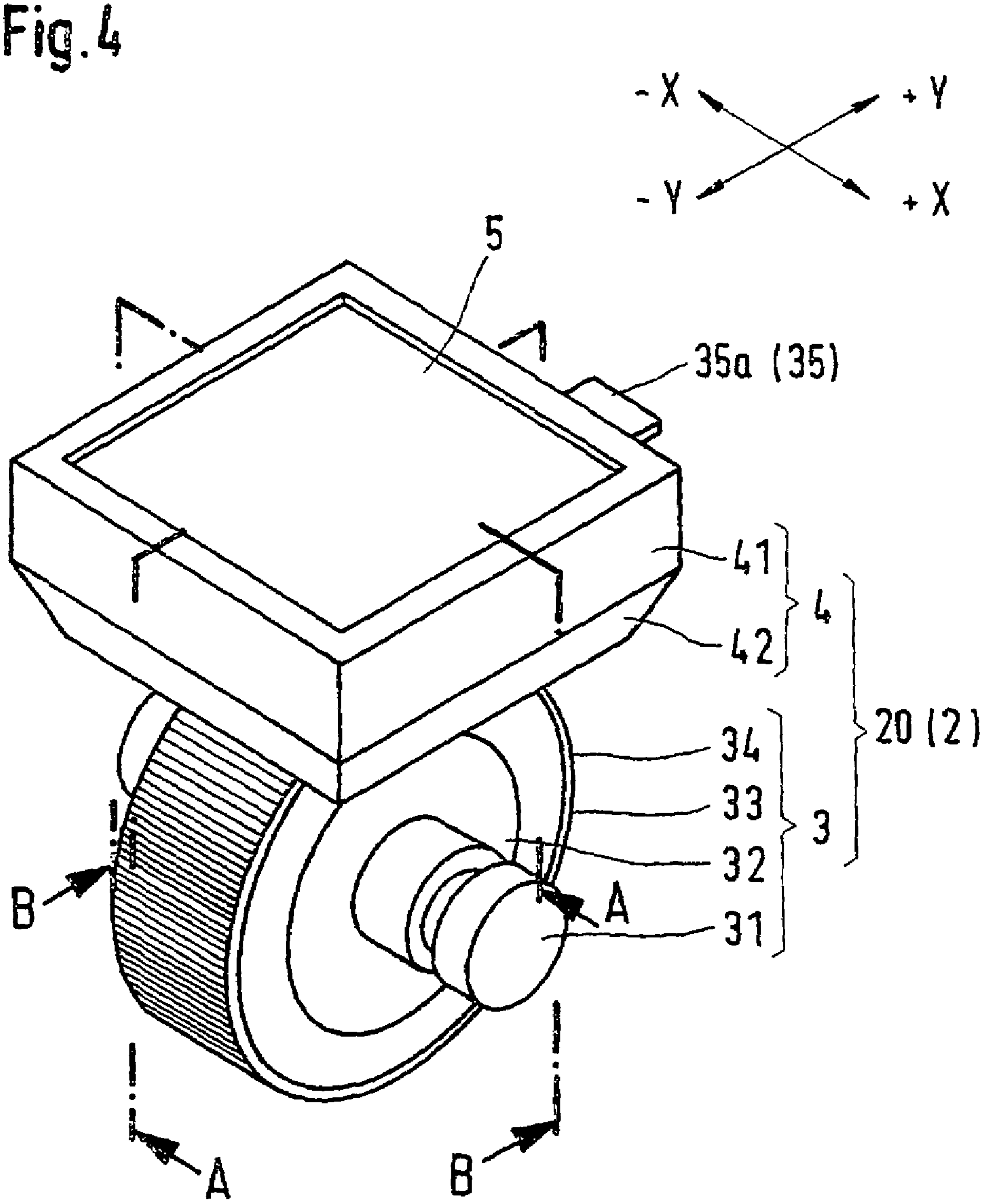
FIG. 4 is a perspective view showing the assembled apparatus main body of FIG. 3.
Figure 5:
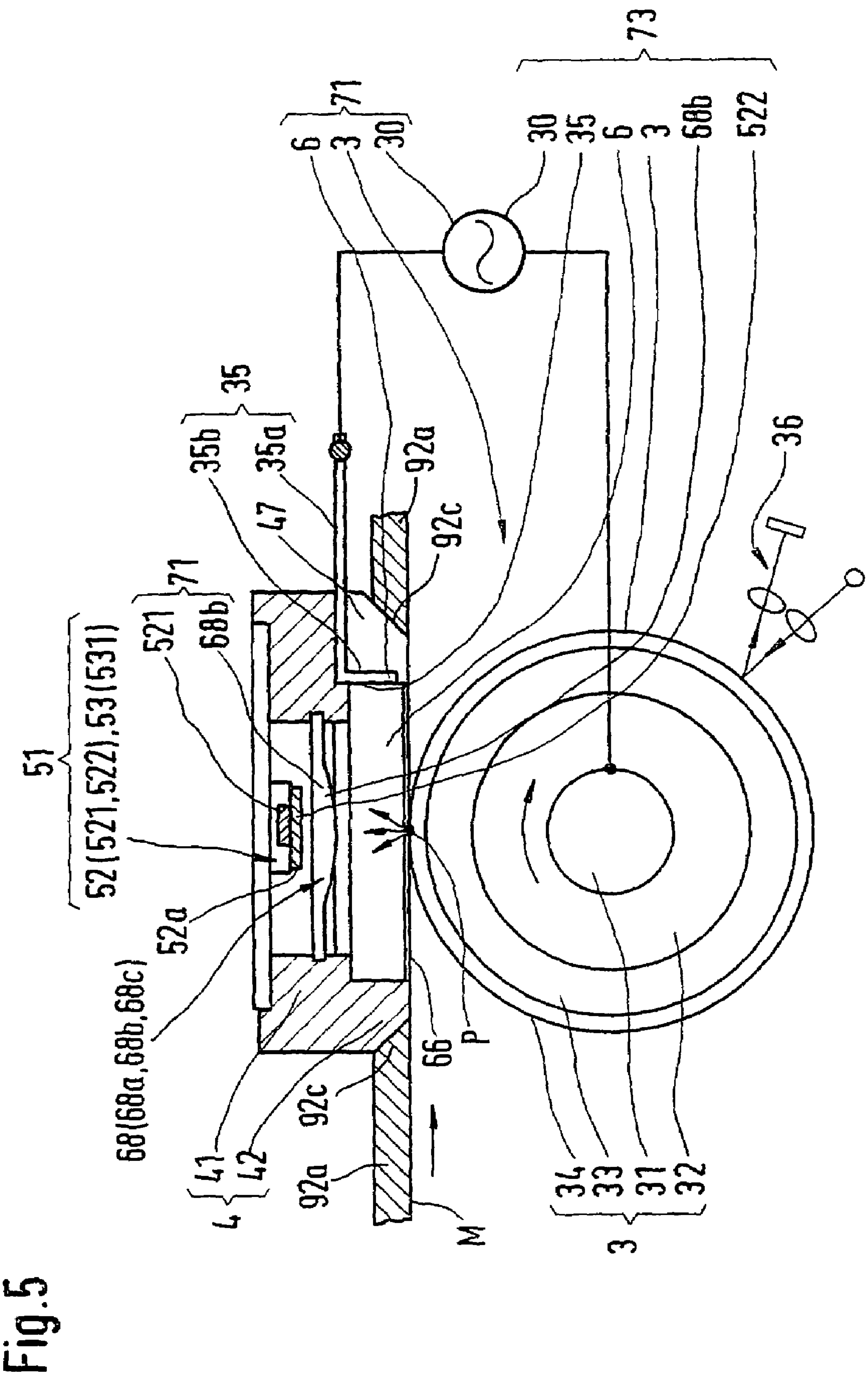
FIG. 5 is a section along A-A of FIG. 4.
Figure 6:
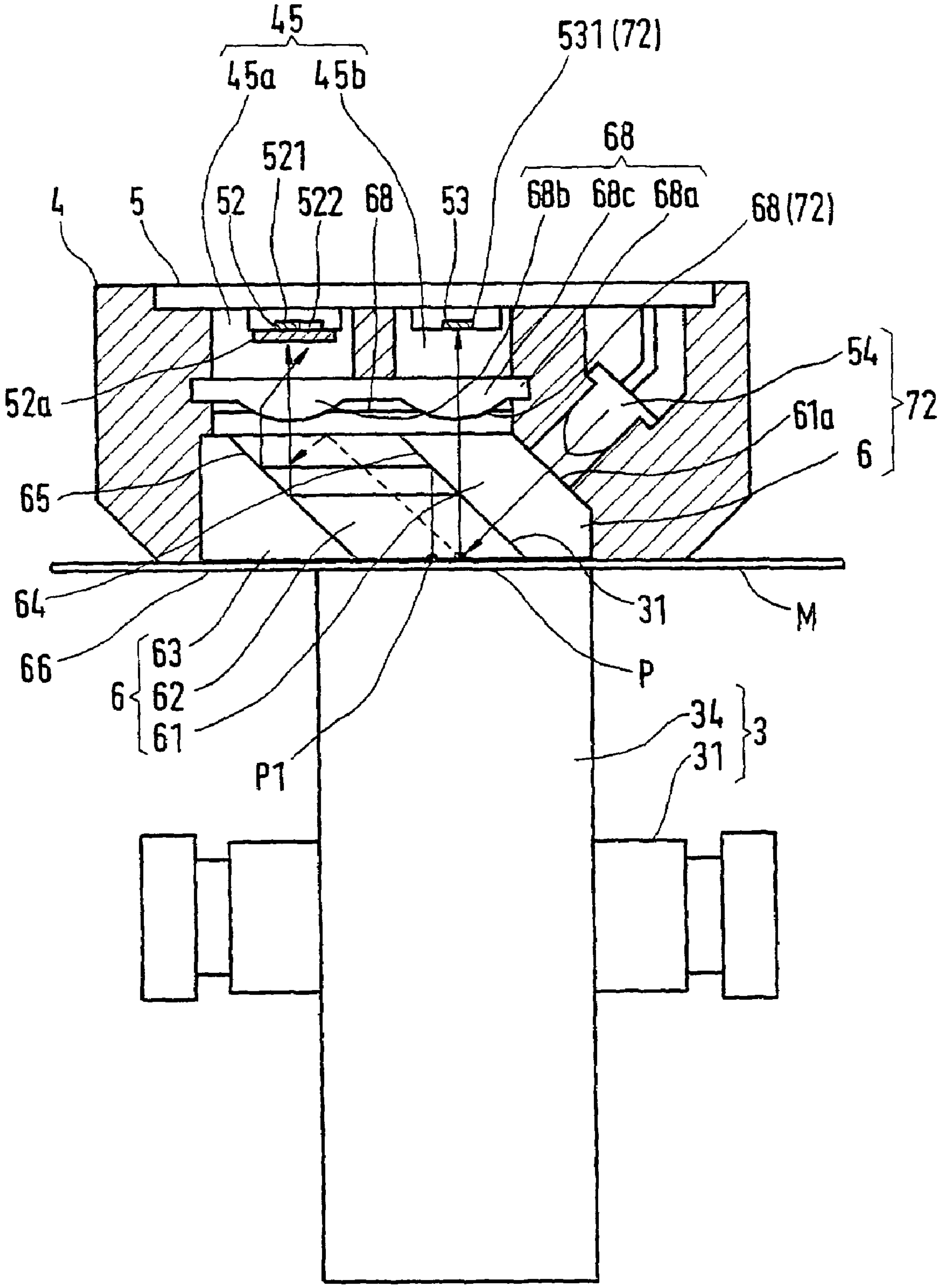
FIG. 6 is a section along B-B of FIG. 4.
Figure 7:
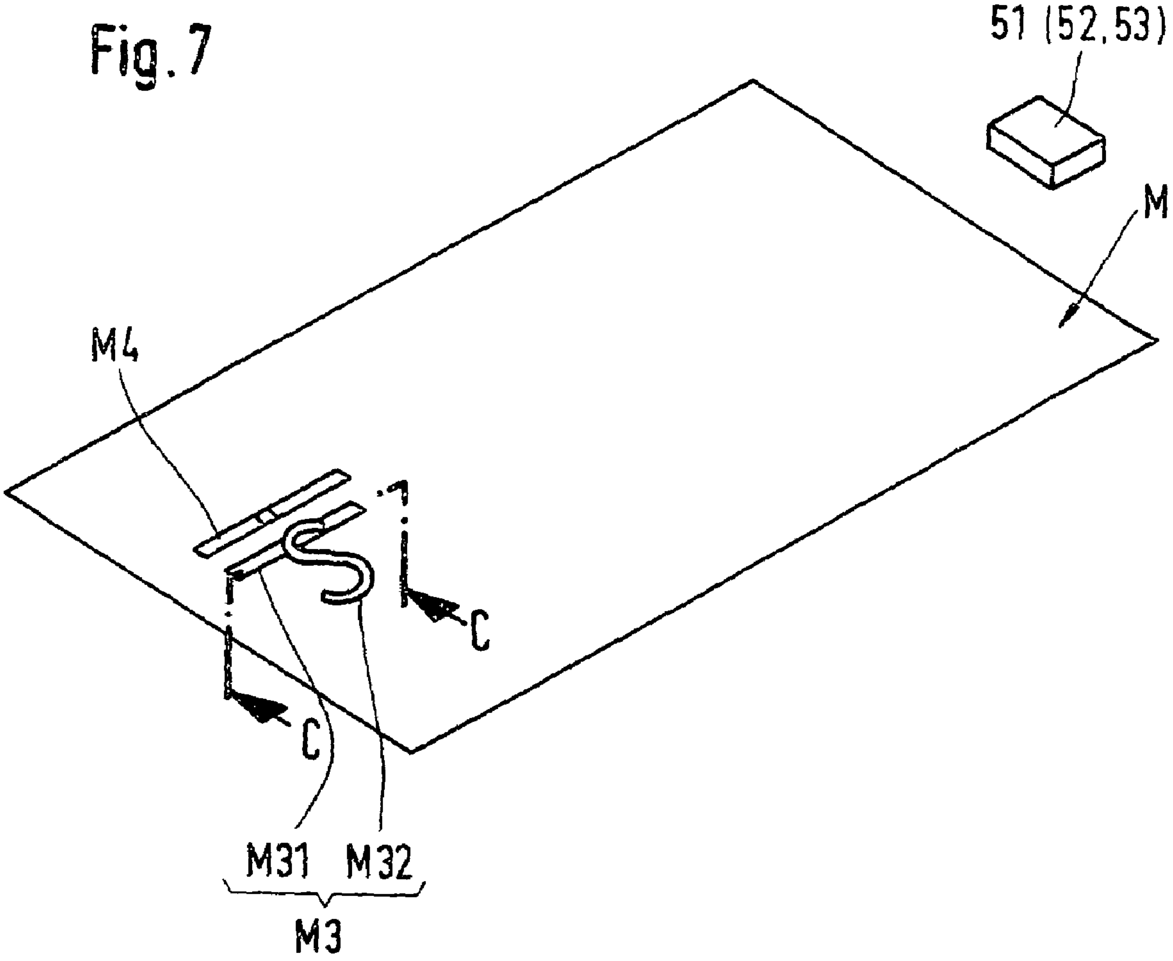
FIG. 7 is a perspective view showing an exemplary printed state of a bank note.
Figure 8A:
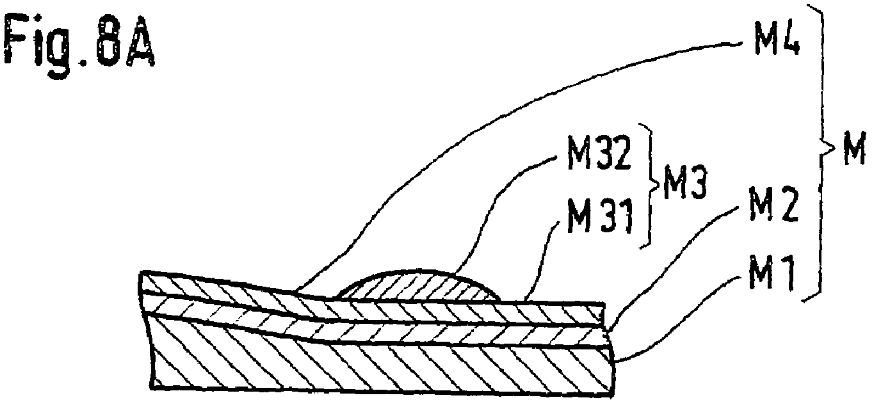
FIG. 8A is an enlarged section along C-C of FIG. 7.
Figure 8B:
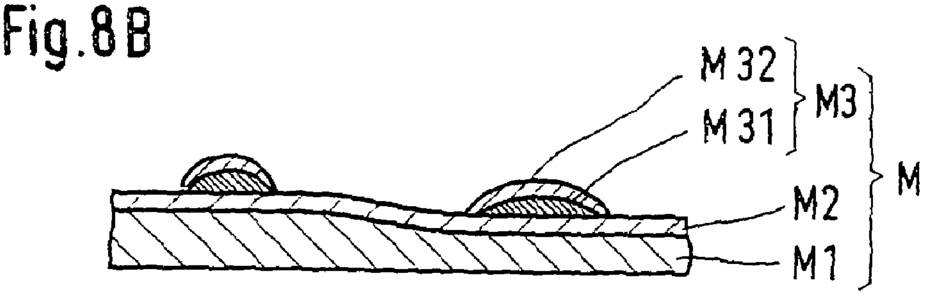
FIG. 8B is an another embodiment of an enlarged section of FIG.7, essentially FIG. 8A with M4 monitor mark elided.
Figure 8C:
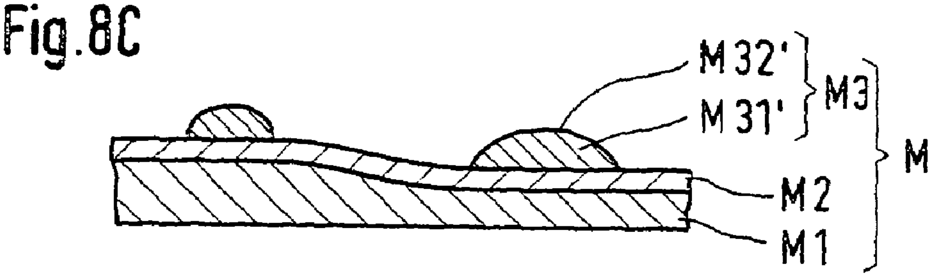
FIG. 8C shows a state where printing is made by a mixed ink obtained by mixing the electroluminescent ink with the usual nonluminescent ink.
Figure 9C:
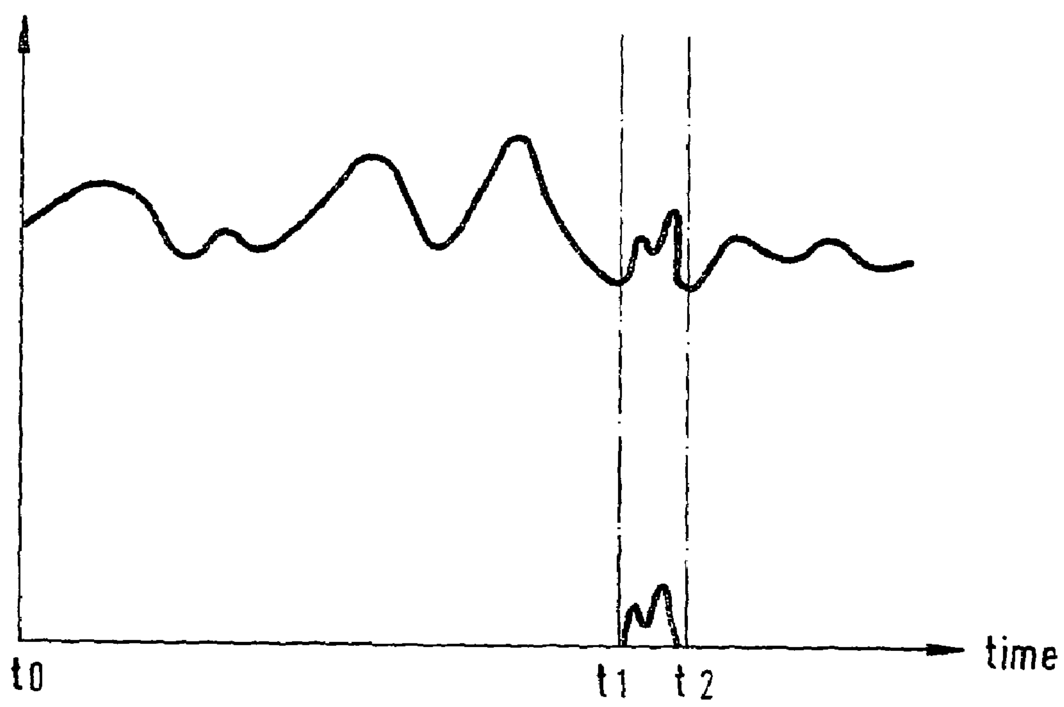
FIG. 9C shows a graph showing changes of output values in proportion to amounts of light detected by first and second light detecting elements during scanning over time.
Figure 9A:
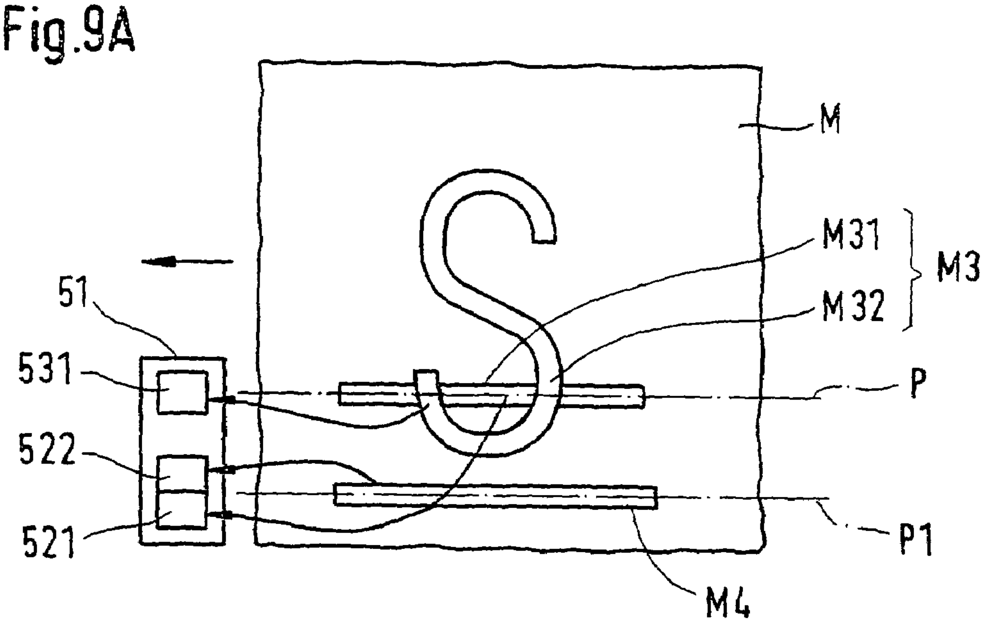
Figure 9B:
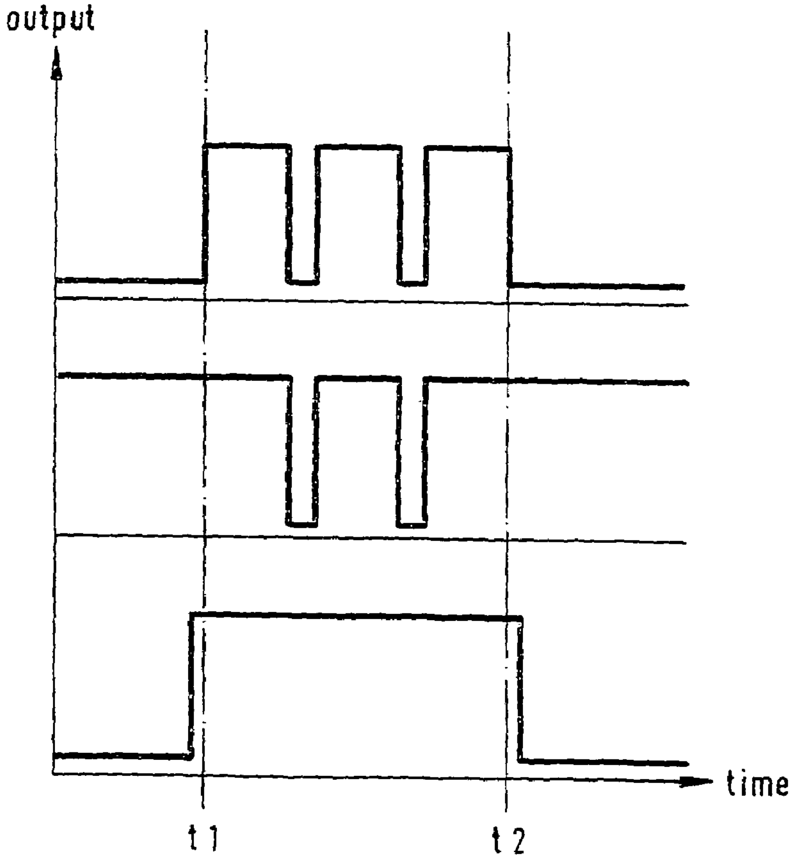
Figure 10A:
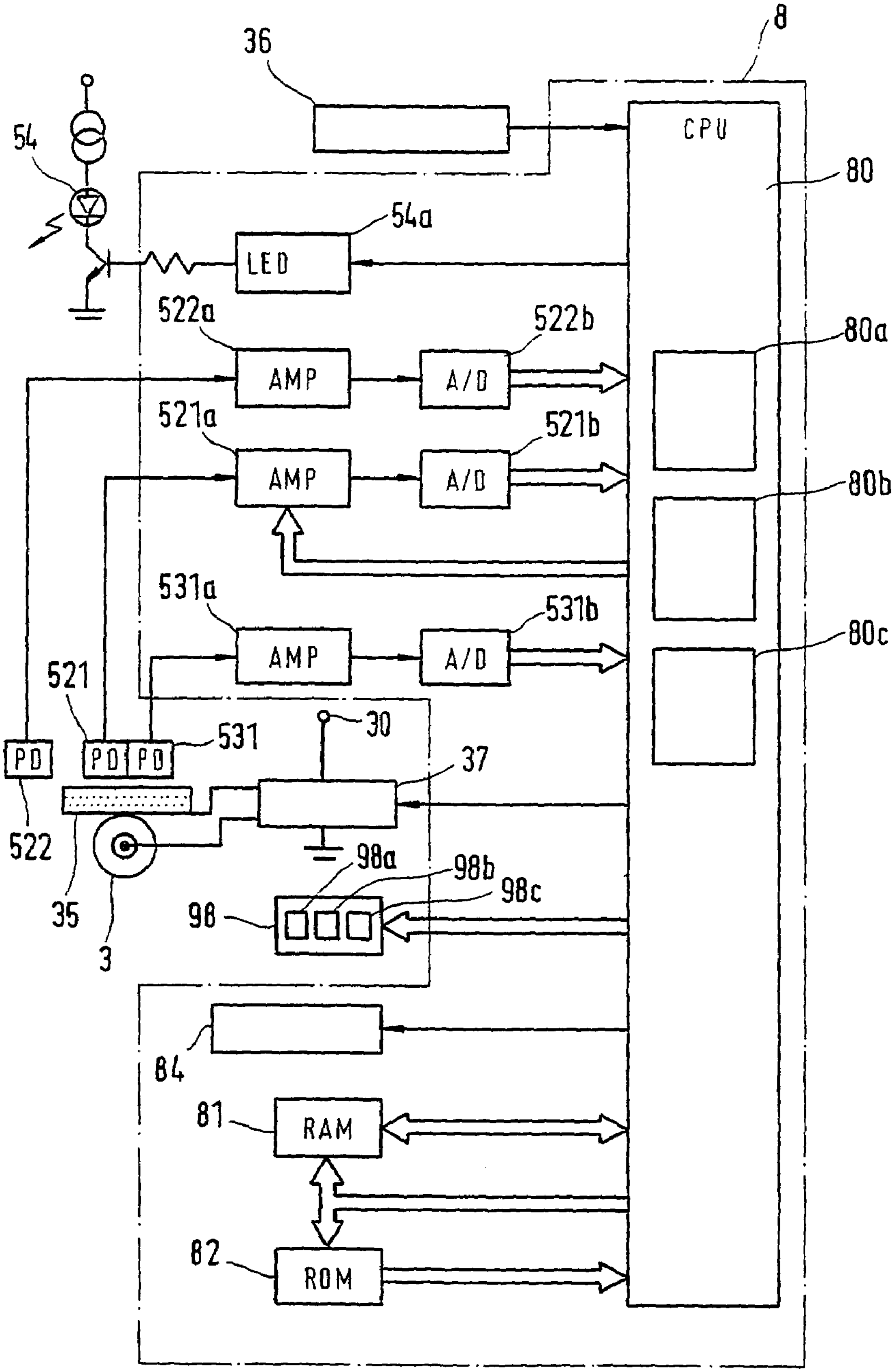
FIG. 10A is a block diagram showing one embodiment of a correction control for the output values corresponding to an el ink portion of a security mark.
Figure 10B:
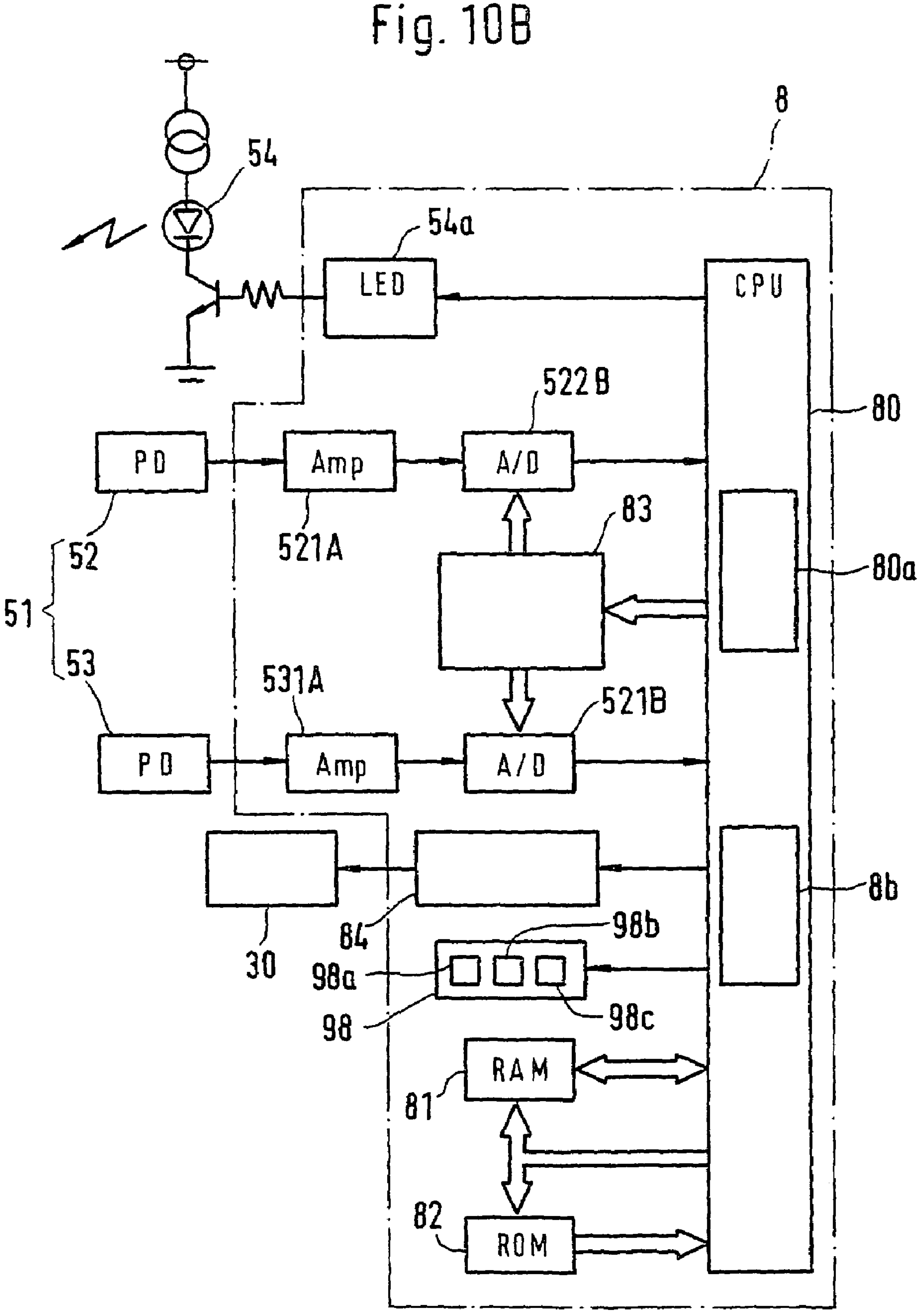
FIG. 10B is a block diagram showing another embodiment of a correction control for the output values corresponding to an el ink portion of a security mark.
Figure 11A:
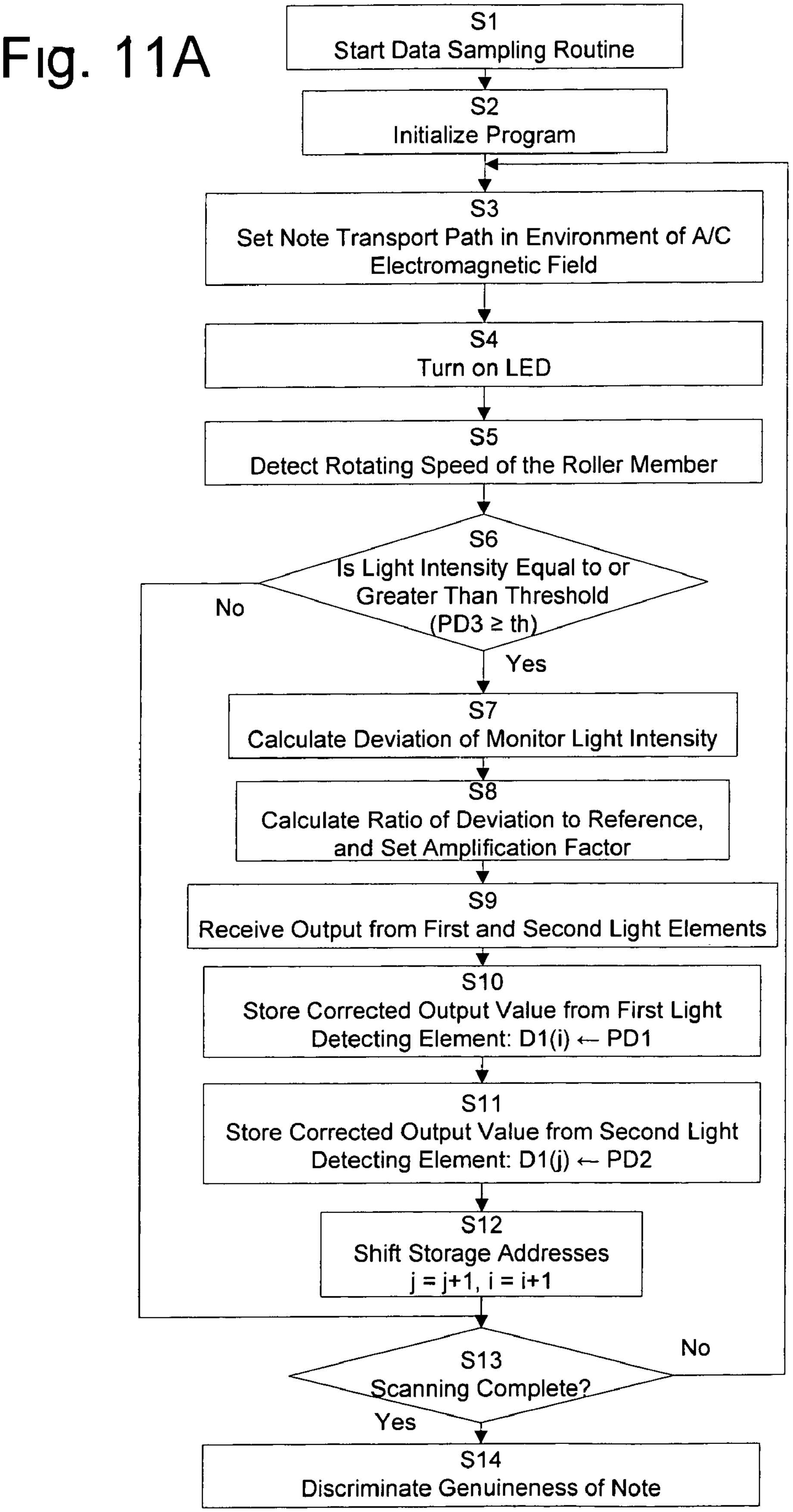
FIG. 11A is a flow chart showing a data sampling routine executed to scan the surface of the bank note by the light detecting device.
Figure 11B:
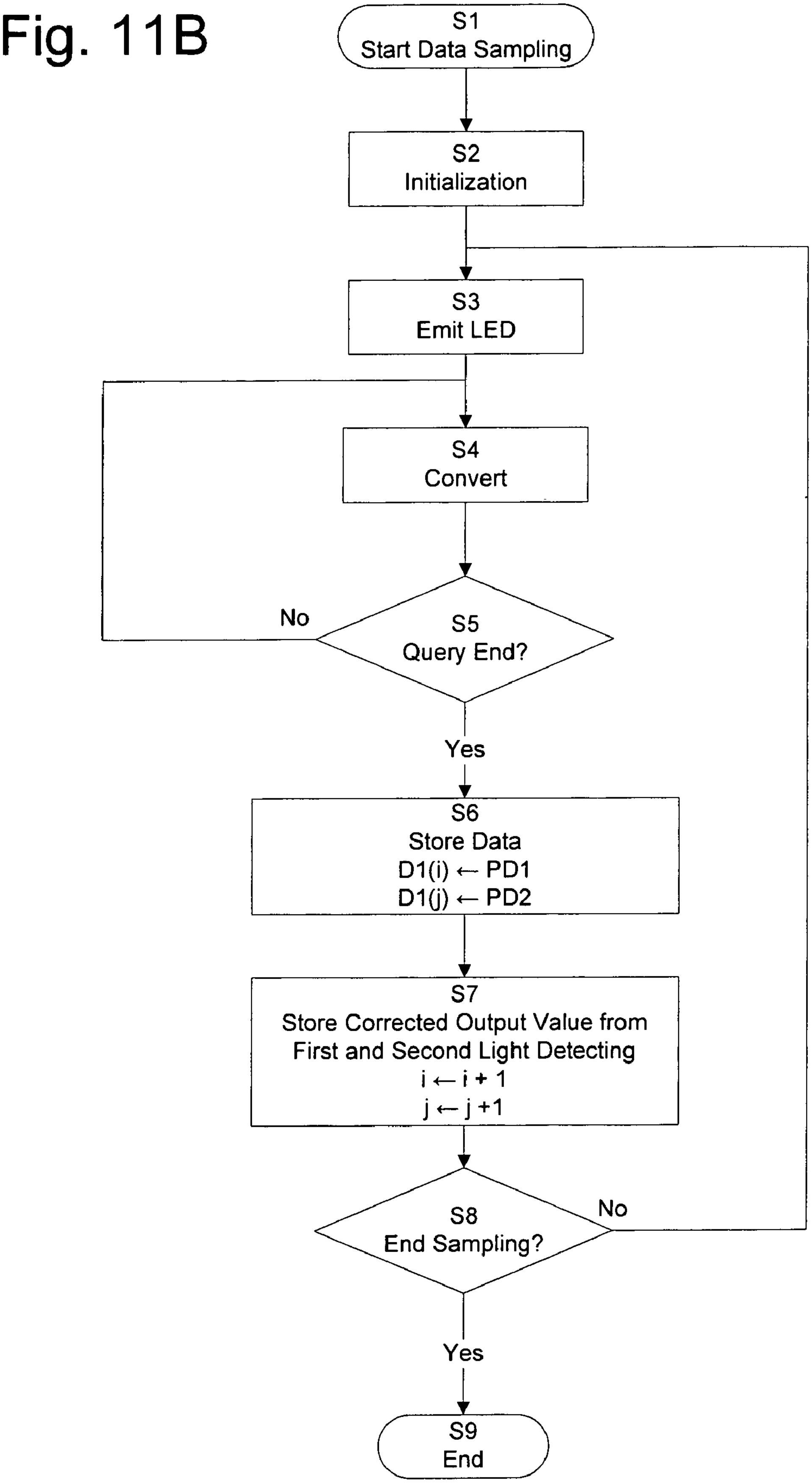
FIG. 11B is another embodiment of a flow chart showing a data sampling routing.
Figure 12A:
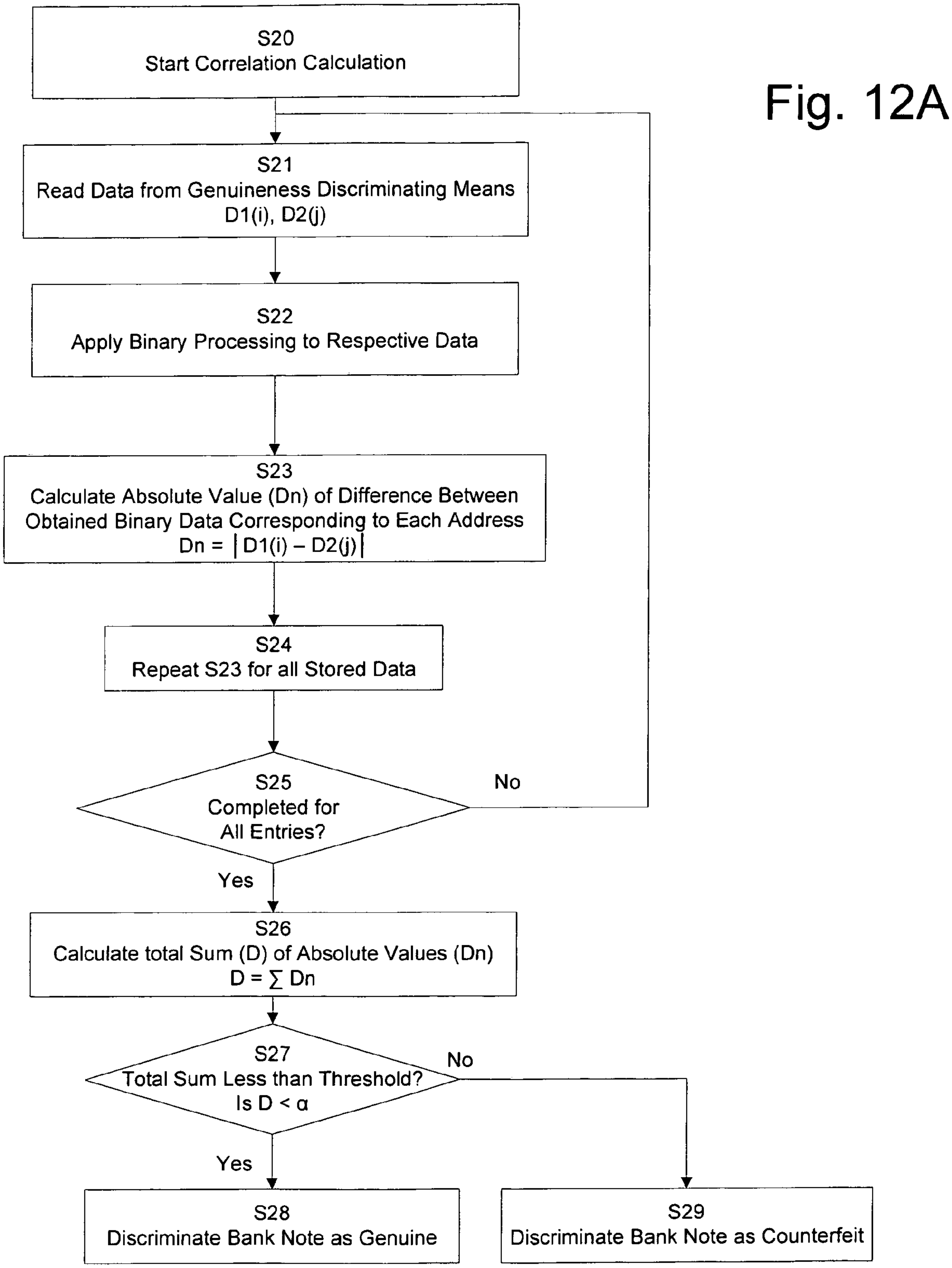
FIG. 12A is a flow chart showing a correlation calculation routine executed to discriminate genuineness based on the scanned data.
Figure 12B:
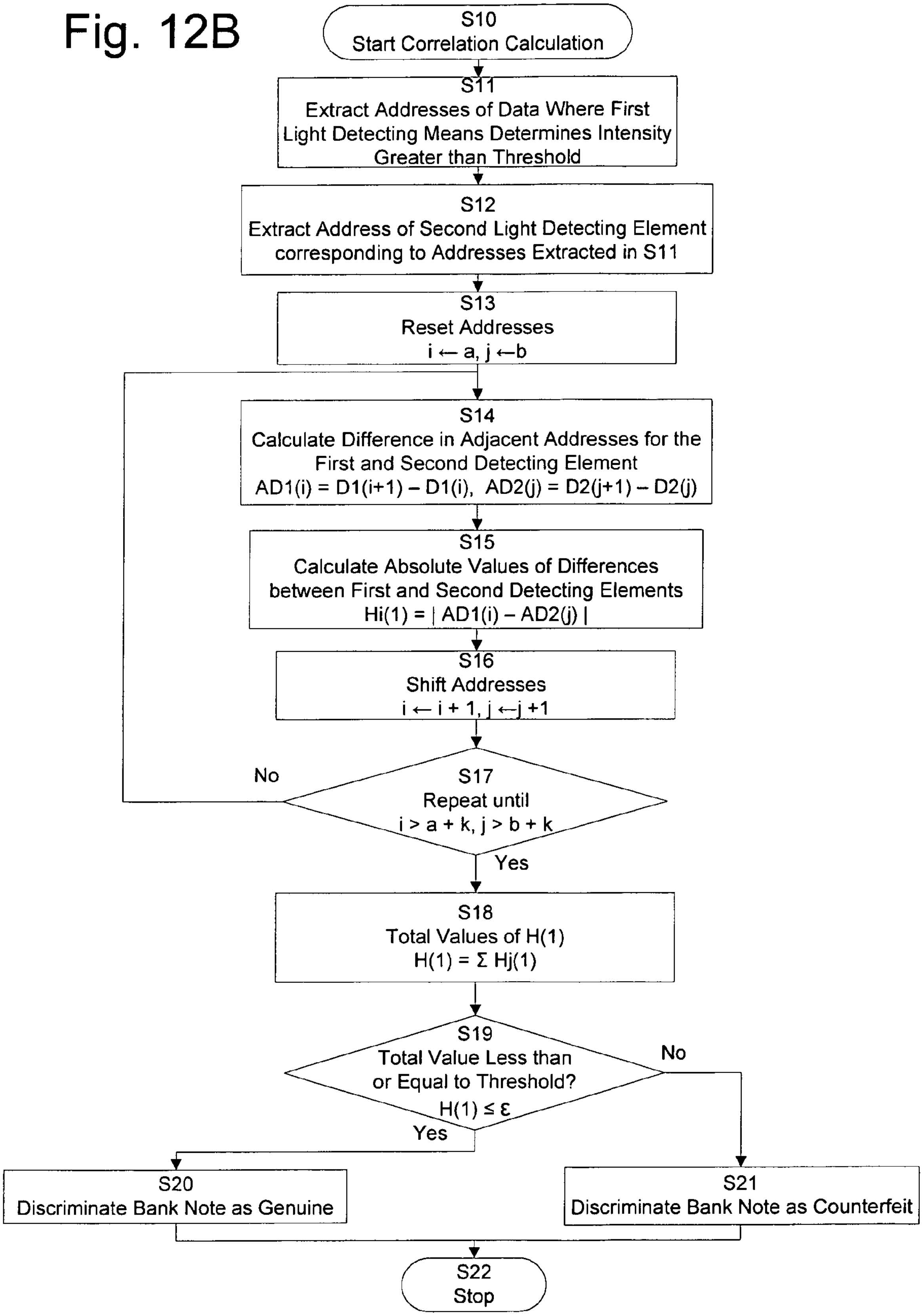
FIG. 12B is another embodiment showing a correlation calculation routine.
Figure 13:
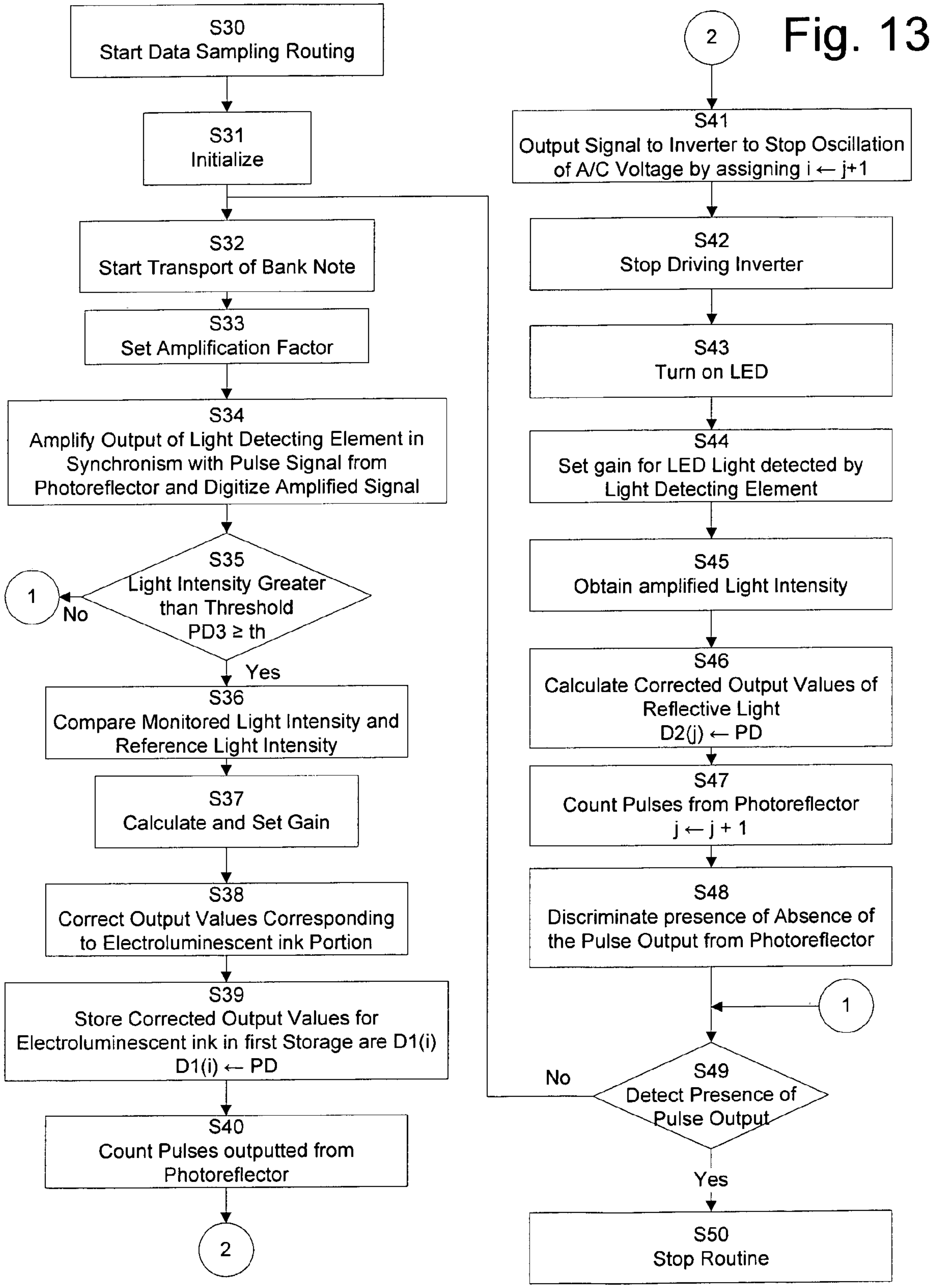
FIG. 13 is a flow chart showing another embodiment in which data of the security mark are sampled by one light detecting element.
Figure 14A:
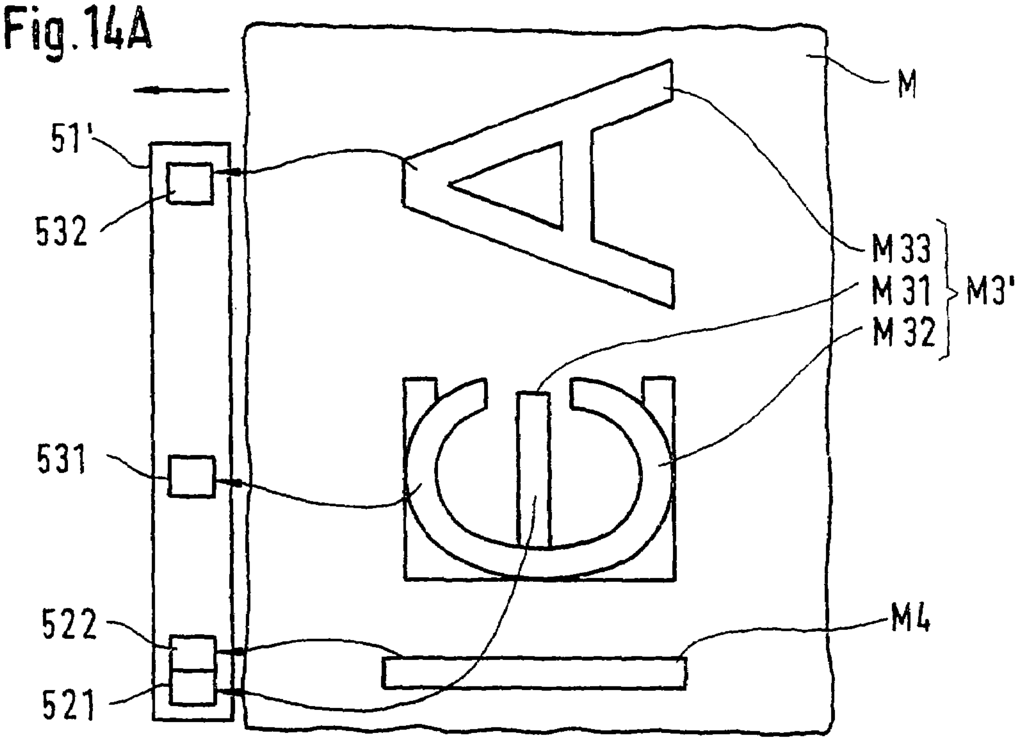
FIGS. 14A and 14B are a diagram showing the security mark and an arrangement of the light detecting device suitable for detecting such a security mark, and graphs showing changes of the output values of the respective light detecting elements over time, respectively.
Figure 14B:
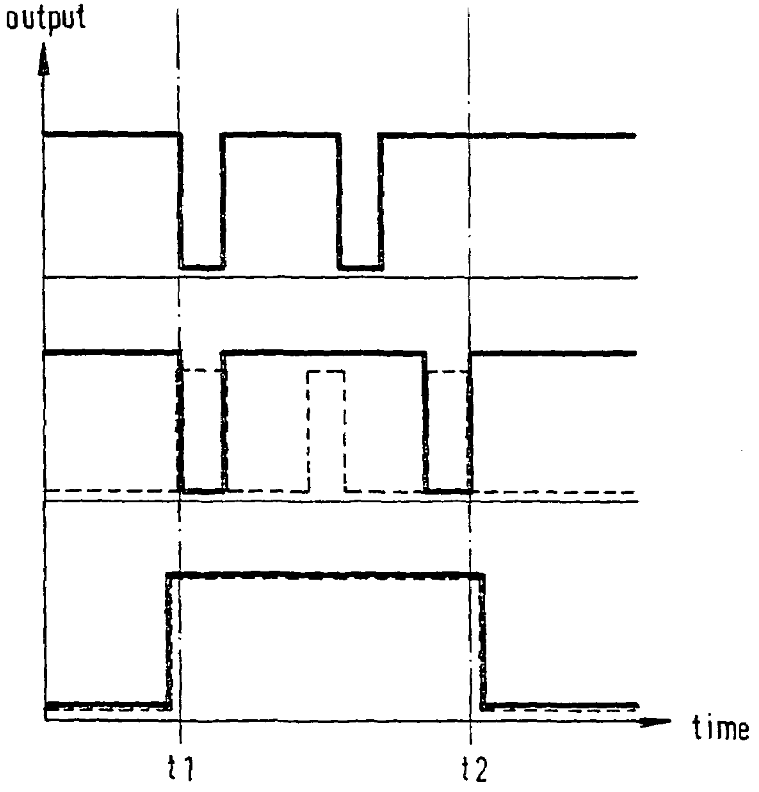
Figure 15:
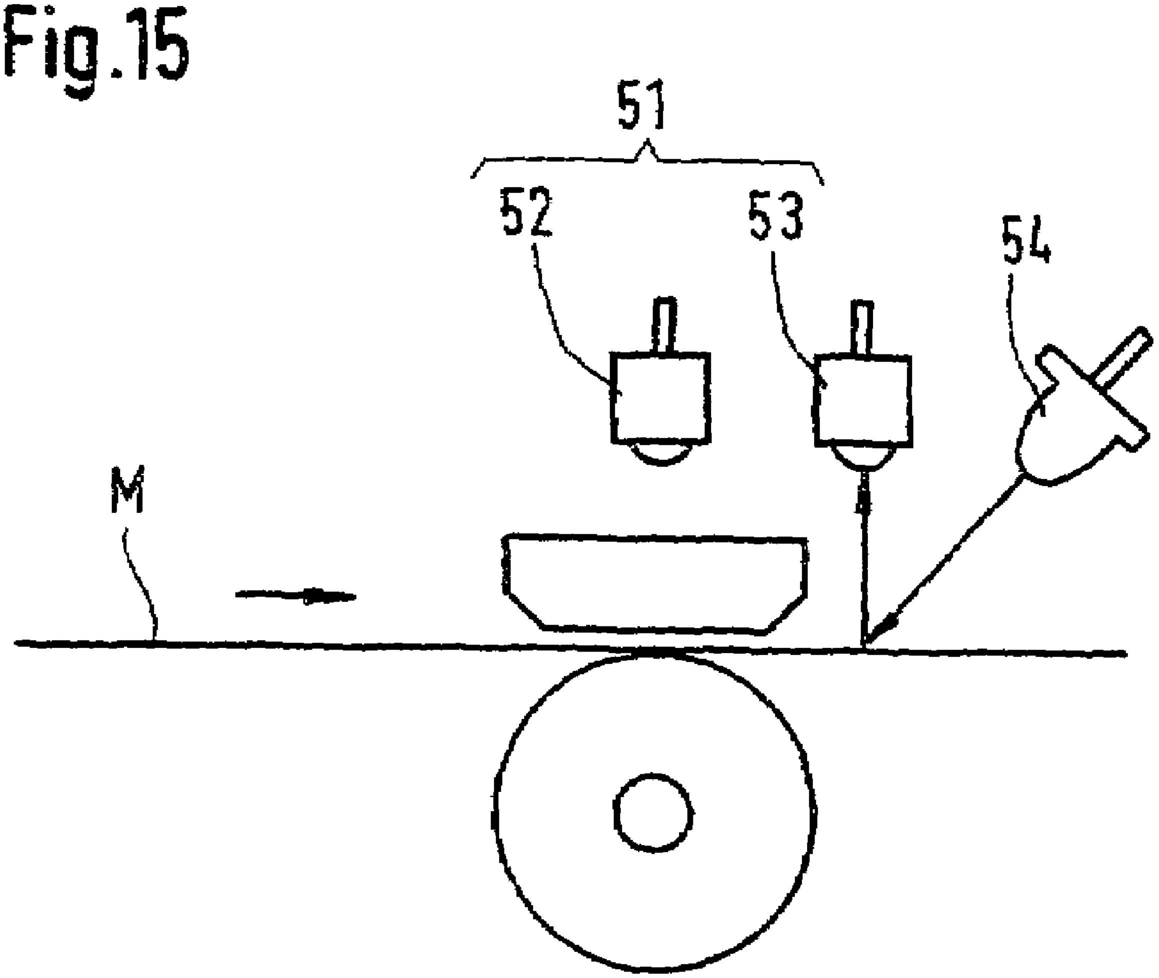
FIG. 15 is a diagram showing another example of arrangement of the first and second detecting elements.

The invention claimed is:

1. A method for discriminating the genuineness of a certified paper having at least one security mark including a non-electroluminescent ink and an electroluminescent ink, comprising the steps of:

scanning at least a portion of the security mark;

exposing at least a portion of the security mark to an alternating electric field;

detecting a first light from the electroluminescent ink in an environment of the alternating electric field with a first light detecting means configured to produce a first output value waveform corresponding to the intensity of light detected from the electroluminescent ink as the security mark is scanned;

detecting a second reflected light from the non-electroluminescent ink with a second light detecting means configured to produce a second output value waveform corresponding to the intensity of the light detected from the non-electroluminescent ink as the security mark is scanned;

detecting the first and the second light from the same position of the certified paper with an optically splitting means, comparing the first and second output value waveforms to a respective first and second reference waveform of a genuine paper to determine the genuineness of the certified paper.

2. A method for discriminating the genuineness of a certified paper having at least one security mark including a non-electroluminescent ink, an electroluminescent ink, and a monitor mark, comprising the steps of:

scanning at least a portion of the security mark;

exposing at least a portion of the security mark to an alternating electric field;

detecting a first light from the electroluminescent ink of the security mark in an environment of the alternating electric field with a first light detecting means configured to produce a first output value waveform corresponding to the intensity of light detected from the electroluminescent ink as the security mark is scanned;

detecting a second reflected light from the non-electroluminescent ink on the security mark with a second light detecting means configured to produce a second output value waveform corresponding to the intensity of the light detected from the non-electroluminescent ink as the security mark is scanned;

detecting a third light emitted from the monitor mark by a third light detecting means configured to produce a third output value waveform corresponding to the intensity of the light detected from the monitor mark as the security mark is scanned;

comparing the first, second and third output value waveforms with a respective first, second and third reference waveform of a genuine paper to determine the genuineness of the certified paper.

3. A method for discriminating the genuineness of a certified paper having at least one security mark including a non-electroluminescent ink, an electroluminescent ink, and a monitor mark, comprising the steps of;

scanning at least a portion of the security mark;

exposing at least a portion of the security mark to an alternating electric field;

detecting a first light from an electroluminescent ink of the security mark in an environment of the alternating electric field with a first light detecting means configured to produce a first output value waveform corresponding to the intensity of the light detected from the electroluminescent ink as the security mark is scanned;

detecting a second pattern of reflected light from a non electroluminescent ink on the security mark with a second light detecting means configured to produce a second output value waveform corresponding to the intensity of the light detected from the non-electroluminescent ink as the security mark is scanned;

detecting the first and second light from the same position of the certified paper with an optically splitting means, detecting a third light from the monitor mark with a third light detecting means configured to produce a third output value waveform corresponding to the intensity of the light detected from the monitor mark as the security mark is scanned;

converting the first output value waveform into a corrected output value waveform utilizing the third output value waveform, and discriminating the genuineness of the certified paper based on the corrected output value waveform.

4. A method for discriminating the genuineness of a certified paper having at least one security mark including a non-electroluminescent ink and an electroluminescent ink, comprising the steps of:

scanning at least a portion of the security mark at a projecting spot with a sensor unit comprising an optical member having a first and a third glass member, each with a slanted surface and a second parallelogrammatic glass member positioned between the first and third class member;

reflecting vertical components of the reflected light to a second light detecting means configured to produce a second output value waveform corresponding to the intensity of the light detected from the non-electroluminescent ink as the security mark is scanned;

transmitting vertical components of the electroluminescent light created at the projection spot P to a first light detecting device by reflecting at right angles by a first dielectric multi-layer film between two glass members and further reflecting at right angles by a second multielectric multi-layer film between two glass members, the first light detecting device configured to produce a first output value waveform corresponding to the intensity of the light detected from the electroluminescent ink as the security mark is scanned;

discriminating the genuineness of the certified paper based on the first and second output value waveform.

5. Method according claim 4, wherein further comprising the step of transmitting vertical components of a third electroluminescent light are created on the certified paper at a monitor spot slightly adjacent to a projection spot to a third light detecting means by reflecting at right angles by a first dielectric multi-layer film between two glass member and further reflecting at right angles by a second dielectric multi-layer film between two glass members, the third light detecting means configured to produce a third output value waveform corresponding to the intensity of the light detected from the monitor spot as the security mark is scanned.

6. Sensor unit for discriminating the genuineness of a certified paper having at least one security mark including a non-electroluminescent ink and an electroluminescent ink, comprising:

a first light detecting means detecting a first light from the electroluminescent ink of the security mark in an environment of an alternating electric field and configured to produce a first output value waveform corresponding to the intensity of the light detected from the electroluminescent ink as the security mark is scanned;

a second light detecting means detecting a second reflected light from the non-electroluminescent ink on the security mark and configured to produce a second output value waveform corresponding to the intensity of the light detected from the non-electroluminescent ink as the security mark is scanned;

an optically splitting means for detecting the first and second light from the same position of the certified paper; and a control unit for comparing the first and second output value waveform with a respective first and second reference waveform of a genuine paper to determine the genuineness of the certified paper.

7. Sensor unit for discriminating the genuineness of a certified paper having at least one security mark including a non-electroluminescent ink, an electroluminescent ink, and a monitor mark, comprising:

a first light detecting means detecting a first pattern of light from an electroluminescent ink of the security mark in an environment of an alternating electric field and configured to produce a first output value waveform corresponding to the intensity of the light detected from the electroluminescent ink as the security mark is scanned;

a second light detecting means detecting a second pattern of reflected light from a non electroluminescent ink on the security mark and configured to produce a second output value waveform corresponding to the intensity of the light detected from the non-electroluminescent ink as the security mark is scanned;

a third light detecting means detecting a third pattern of light emitted from a monitor mark and configured to produce a third output value waveform corresponding to the intensity of the light detected from the monitor mark as the security mark is scanned; and a control unit for comparing the first, second and third output value waveform with a respective first second and third reference waveform of a genuine paper to determine the genuineness of the certified paper.

8. Sensor unit for discriminating the genuineness of a certified paper having at least one security mark including a non-electroluminescent ink, an electroluminescent ink, and a monitor mark, comprising:

a first light detecting means detecting a first light from an electroluminescent ink of the security mark in an environment of an alternating electric field and configured to produce a first output value waveform corresponding to the intensity of the light detected from the electroluminescent ink as the security mark is scanned;

a second light detecting means detecting a second reflected light from a non electroluminescent ink on the security mark and configured to produce a second output value waveform corresponding to the intensity of the light detected from the non-electroluminescent ink as the security mark is scanned;

an optically splitting means for detecting the first and second light from the same position of the certified paper;

a third light detecting means detecting a third light from the monitor mark and configured to produce a third output value waveform corresponding to the intensity of the light detected from the monitor mark as the security mark is scanned;

a light intensity comparing means for comparing the third output waveform with a present reference waveform for calculating a deviation from the reference waveform; and a light converting means for converting the first output value waveform into a corrected output value waveform; and a genuineness discriminating means for discriminating the genuineness of the certified paper based on the corrected output value waveform.

9. Sensor unit for discriminating the genuineness of a certified paper having at least one security mark including a non-electroluminescent ink and an electroluminescent ink, comprising:

an first optical member having a first and a third glass member, each with a slanted surface and a second parallelogrammatic glass member positioned between the first and third glass member, the first optical member directed at a projecting spot on the surface of the certified paper;

a second light detecting means for detecting reflected vertical components of a reflected light from the non-electroluminescent ink and configured to produce a second output value waveform corresponding to the intensity of the light detected from the non-electroluminescent ink as the security mark is scanned; and a second optical member having a first dielectric multi-layer film between two glass members reflecting at right angles and a second multielectric multi-layer film between two glass members further reflecting at right angles;

a first light detecting device for detecting vertical components of an electroluminescent light emitted by the electroluminescent ink at the projection spot and transmitted to the first light detecting device by the second optical member, the first light detecting device configured to produce a first output value waveform corresponding to the intensity of the light detected from the electroluminescent ink as the security mark is scanned; and a genuineness discriminating means for discriminating the genuineness of the certified paper utilizing the first and second output value waveforms.

10. Sensor unit according claim 9, further comprising:

a third light detecting means for detecting vertical components of an electroluminescent light created on the certified paper at a monitor spot slightly adjacent to the projection spot, the third light detecting device configured to produce a third output value waveform corresponding to the intensity of the light detected from the monitor spot as the security mark is scanned, and the vertical components of the electroluminescent light created at the monitor spot are transmitted to the third light detecting means by a first dielectric multi-layer film between two glass members reflecting at right angles and further reflected by a second dielectric multi-layer film between two glass members reflecting at right angles, wherein the genuineness discriminating means utilizes the third output value waveform to discriminate the genuineness of the certified paper.

* * * * *